United States Patent [19]
Suzuki et al.

[11] Patent Number: 6,094,218
[45] Date of Patent: *Jul. 25, 2000

[54] IMAGE READING AND READOUT SYSTEM

[75] Inventors: Maki Suzuki, Ichikawa; Eisaku Maeda, Sakura; Hidehisa Tsuchihashi, Tokyo; Nobuhiro Fujinawa, Yokohama, all of Japan

[73] Assignee: Nikon Corporation, Tokyo, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/888,673

[22] Filed: Jul. 7, 1997

[30] Foreign Application Priority Data

Jul. 9, 1996 [JP] Japan ..................... 8-179223
Apr. 1, 1997 [JP] Japan ..................... 9-083008

[51] Int. Cl.⁷ .............................. H04N 5/253; H04N 9/47
[52] U.S. Cl. .............................. 348/96; 348/97; 358/301
[58] Field of Search ............... 348/96–97; 358/301–302, 358/452–453, 537–538; 399/144; 382/298, 305; 396/429; 386/124–125

[56] References Cited

U.S. PATENT DOCUMENTS

| | | | |
|---|---|---|---|
| 5,508,783 | 4/1996 | Iwagaki et al. ........................ | 355/40 |
| 5,752,114 | 5/1998 | Saito et al. ........................ | 348/96 |
| 5,805,206 | 9/1998 | Yokonuma et al. ........................ | 348/96 |
| 5,808,667 | 9/1998 | Sugiyama ........................ | 348/96 |
| 5,832,133 | 11/1998 | Smith ........................ | 348/96 |
| 5,838,364 | 11/1998 | Ishibe et al. ........................ | 348/96 |
| 5,850,253 | 12/1998 | Inoue et al. ........................ | 348/96 |

Primary Examiner—Vu Le
Attorney, Agent, or Firm—Oliff & Berridge, PLC

[57] ABSTRACT

An image reading system that reads long-type film images and displays the images on a monitor screen. The image reading system includes a display method having the capability to effectively utilize, on the monitor screen, all of the image information that is on the film, and which allows easy imaging capability of the final image when changes have been made to the original image. The image reading system creates first image data corresponding to roughly the entire body of the image storage region based on the image signal, and creates second image data corresponding to the image of the image storage region that has been trimmed based on trimming-related related information included in the image signal and magnetic information. The image reading system displays the first image corresponding to the first image data and the second image corresponding to the second image data on the display.

7 Claims, 19 Drawing Sheets

2

IMAGE READING AND READOUT SYSTEM

The disclosures of the following priority applications are herein incorporated by reference: JP 8-179223, filed Jul. 9, 1996 and JP 9-83008, filed Apr. 1, 1997.

BACKGROUND OF THE INVENTION

1. Field of Invention

The present invention relates to an image reading and readout system that reads the image of each frame of a long-type film, displays the image on a monitor screen, and provides a method of trimming the image.

2. Description of Related Art

The image reading system is composed of a film image reading device, or film scanner. The film scanner, under the control of a host computer, reads the image of a film negative or reverse film. The host computer collects image data and controls the display of the image on the monitor screen.

In recent years, new types of film have been proposed. One of these is a long type of film (referred to below as "roll film") which is left in a film cartridge even after development. The roll film is equipped with a magnetic storage region in each frame. In each magnetic storage region, a photographic item is recorded when photography is performed. Print sizes C, H, and P are included in the photographic item.

The C size is called the classic size, and has an aspect ratio of 3:2. The H size is called the high-vision size, and has an aspect ratio of 16:9. The P size is called the panorama size, and has an aspect ratio of 3:1.

In addition to reading the image of each frame, the film image reading device also reads the magnetic information of each magnetic storage region. The host computer executes trimming processing of image data received from each frame, according to the aspect ratio determined by the print size included in the magnetic information, and then displays the image on the monitor screen.

Accordingly, in a conventional image reading system that handles roll film, not all of the image information of the frame read by the film image reading device is displayed on the monitor screen. Only the trimmed frame image, which was automatically trimmed according to the aspect ratio determined by the print size included in the magnetic information, is displayed on the monitor screen.

Sometimes the user sees the frame image displayed on the monitor screen and wants to add changes to the print size set during photography. However, a conventional display method ignores part of the image information on the film, as explained above.

Accordingly, the user cannot freely select, on the monitor screen, all of the image information for the film. Instead, the user can only change the frame image displayed according to the aspect ratio determined by the print size set during photography. Therefore, it is difficult to obtain a frame image of a satisfactory size.

Further, in a conventional display method, the frame image is displayed on the monitor screen based on the aspect ratio determined by the print size. Because the print size is only set during photography, when the user changes the image size, the user must do so without knowing what the print size was originally set to. This also points out why it is difficult in a conventional display method to obtain a frame image of a satisfactory size.

SUMMARY OF THE INVENTION

The present invention has an objective to provide an image reading display system equipped with a display method that performs size changes on the monitor screen, effectively using all of the image information on the film, and that can easily scan the final image resulting after changes have been added.

According to a first embodiment, an image reading system is provided having an image reading device for reading the image, frame-by-frame, of long-type film provided with an image storage region and a magnetic storage region in each frame, and outputting an image signal. A magnetic information reading device reads the magnetic information of the magnetic storage region, and outputs a magnetic signal. A display device displays an image and a control device creates a first image data corresponding to roughly the entire body of the image of the image storage region, based on the image signal. The control device also creates a second image data corresponding to the image of the image storage region, which has been trimmed based on the image signal and information related to trimming that is included in the image signal and the magnetic signal. The control device further displays a first images corresponding to the first image data, and a second image corresponding to the second image data on the display device.

The image treading system may also include a trimming size setting device for setting the trimming size of the image of the image storage region, and for outputting a trimming signal. The control device converts the second image data to third image data based on the image signal and the trimming signal, and displays a first image corresponding to the first image data and a third image corresponding to the third image data on the display device.

The image reading system may still further include a magnetic information writing device for writing the trimming size information set via the trimming size setting device into the magnetic storage region.

According to a second embodiment, an image reading system includes an image reading device for reading the image, frame-by-frame, of long-type film provided with an image storage region and a magnetic storage region in each frame, and outputting an image signal. A magnetic information reading device reads the magnetic information of the magnetic storage region and outputs a magnetic signal. A display device displays an image and a control device creates a first image data corresponding to roughly the entire body of the image of the image storage region, based on the image signal. The control device also creates first trimming frame data, based on the image signal and on information relating to trimming, which is included in said image signal and the magnetic signal. The control device also displays a first image corresponding to the first image data on the display device and displays a first trimming frame corresponding to the first trimming frame data on the display device, superimposed on the first image.

The image reading system may further include a trimming size setting device for setting the trimming size of the image of the image storage region, and for outputting a trimming signal. The control device converts the first trimming frame data, based on the image signal and the trimming signal, into second trimming frame data, and displays a second trimming frame corresponding to the second trimming frame data on the display device, superimposed on the first image.

The image reading system may still further include a magnetic information writing device for writing trimming size information set via the trimming size setting device into said magnetic storage region.

The image reading system may also include an image reading device having the magnetic information reading device and the magnetic information writing device and a host computer having the display device, the control device, and the trimming size setting device.

The image reading system may also include an image size designating device for setting enlargement or reduction with regard to the image within the trimming frame and for outputting enlargement data or reduction data. A magnetic information device writes in the magnetic storage region, where the control device enlargement converts or reduction converts the first image data into second image data based on the enlargement data or reduction data, displays the second image corresponding to the second image data on the display device, and writes the enlargement data or reduction data in the magnetic information writing device.

The image reading device reads each frame of the image, frame by frame, of the long-type film that is equipped with an image storage region and a magnetic storage region in each frame, and outputs an image signal. The magnetic information reading device reads the magnetic information of the magnetic storage region and outputs a magnetic signal.

Further, the control device may create first image data corresponding to roughly the entire body of the image of the image storage region, based on the image signal, and may create second image data corresponding to the image of the image storage region, in which trimming has been performed based on information relating to trimming included in image signals and magnetic signals. The control device then displays a first image corresponding to the first image data, and a second image corresponding to the second image data, on the display device. Accordingly, a user may confirm the trimming image (the second image) that corresponds to the original image (the first image) by direct comparison.

In addition, a trimming size setting device may set the trimming size of the image of the image storage region and output a trimming signal. The control device converts the second image data to third image data, based on the image signal and the trimming signal, and displays the first image corresponding to the first image data, and a third image corresponding to the third image data, on the display device. Thus, the user may confirm the trimming image (the third image) corresponding to the original image (the first image) by direct comparison.

The magnetic information writing device may write the information of the trimming size set by the trimming size setting device into the magnetic storage region. Accordingly, when the user obtains the image desired by trimming through direct comparison of the trimming image (the second image) against the original image (the first image), and further, by trimming through direct comparison of the trimming image (the third image) and the original image (the second image), performing the trimming a plurality of times, the desired image and the trimming result may be saved.

In one embodiment, the image reading device reads each frame of the image, frame by frame, of the long film that is equipped with an image storage region and a magnetic storage region in each frame, and outputs an image signal. The magnetic information reading device reads the magnetic information of the magnetic storage region and outputs a magnetic signal.

The control device creates first image data corresponding to roughly the entire body of the image of the image storage region, based on the image signal, and creates a first trimming frame data, based on information relating to trimming included in image signals and magnetic signals. Then, the control device displays the first image corresponding to the first image data on the display device, and displays the first trimming frame, corresponding to the first trimming frame data, as superimposed on the first image, on the display device. Accordingly, the user may directly confirm the trimming frame corresponding to the original image (the first image).

The trimming size setting device may set the trimming size of the image of the image storage region, and output a trimming signal. Further, the control device may convert the first trimming frame data to second trimming frame data, based on the image signal and the trimming signal, and display the second trimming frame corresponding to the second trimming frame data as superimposed on the first image, on the display device. Accordingly, the user can easily compare the second trimming frame and the original image (the first image) to decide if the second trimming frame should be the final output image.

In one embodiment, the magnetic information writing device writes the information of the trimming size set by the trimming size setting device into the magnetic storage region. Accordingly, the user may perform trimming by direct comparison of the first trimming frame against the original image (the first image), and further, by direct comparison of the second trimming frame against the original image (the first image), performing trimming a plurality of times. When the desired image has been obtained, it can be saved along with the trimming results.

The image reading system may include an image reading device having a magnetic information reading device and a magnetic information writing device. In addition, the host computer may include a display device, a control device, and a trimming size setting device. Accordingly, the image reading system is easily and simply composed, without requiring changes in hardware.

In one embodiment, an image size setting device, with regard to the image within the trimming frame, is set as enlarged or reduced, and outputs enlarged data or reduced data. The control device, based on the enlarged data or the reduced data, enlargement converts or reduction converts the first image data to second image data, and displays the second image corresponding to the second image data on the display device, and performs writing of the enlarged data or the reduced data into the magnetic information writing device.

Accordingly, the user can easily and simply perform an operation to obtain the desired image, performing enlargement display or reduction display of the original image, within a certain trimming frame, and further, can save the results.

BRIEF DESCRIPTION OF THE DRAWINGS

The invention will be described with reference to the following drawings in which like reference numerals refers like elements and wherein.

DETAILED DESCRIPTION OF PREFERRED EMBODIMENTS

The preferred embodiments of the present invention are described below with reference to the drawings.

Figure 1:
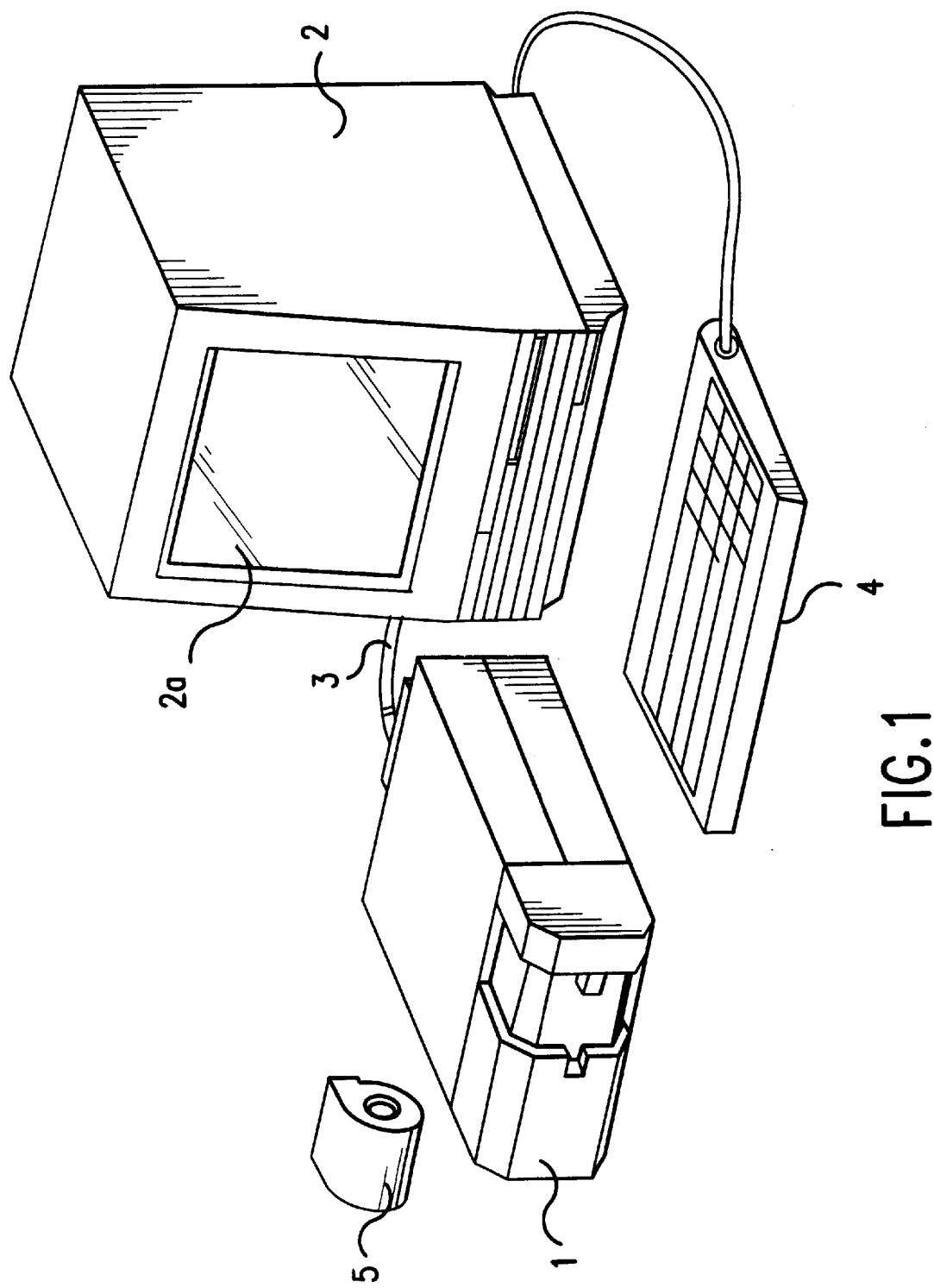
FIG. 1 is an outer view of an image reading system of one embodiment of the present invention.

FIG. 1 is an outer view of an image reading system of one embodiment of the present invention. As shown in FIG. 1, the image reading system is composed mainly of the film image reading device 1 and a control device 2.

The control device 2 is composed of a central processing device (referred to below as a CPU), a computer device equipped with a program memory and a working memory, and a display device having a monitor screen 2a as its output device.

The film image reading device 1 is connected by a communication cable 3, used as the input device of the computer device. Input tools including a keyboard 4 and a mouse (not shown) may be connected to the computer device.

Film image reading devices generally fall into one of two categories: 1) light transmission type, in which light is transmitted through the original film and is read by a live sensor; and 2) light reflective type, in which light is reflected off the original film and is read by a line sensor. In both types of image reading devices, either the original film is moved relative to a fixed line sensor or the line sensor is moved relative to a fixed film.

The film image reading device 1 of the first embodiment of the present invention is a light transmission type, in which the film original document is moved relative to the line sensor.

Figure 2:
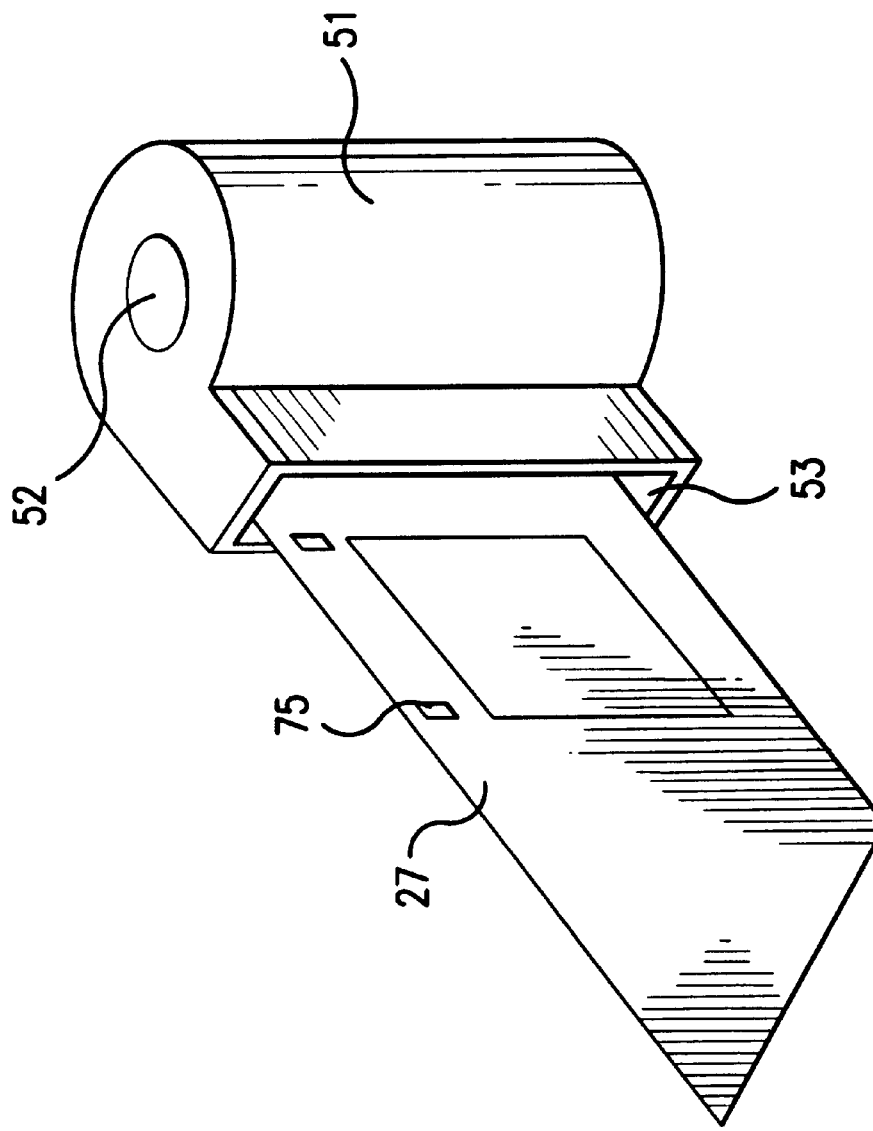
FIG. 2 is an outer view of a cartridge used in one embodiment of the present invention.

A cartridge 5 is loaded into the film image reading device 1. FIG. 2 is an outer view of the cartridge 5. A cylindrical case 51 axially supports a cartridge spool 52 on both ends in the longitudinal direction of the cartridge spool 52. The cartridge spool 52 is free to rotate in the cylindrical case 51.

The cylindrical case 51 is provided with an aperture 53 along one side. The roll film 27 enters and exits the case 51 through the aperture 53, and is wound or is fed out by the cartridge spool 52.

Figure 3:
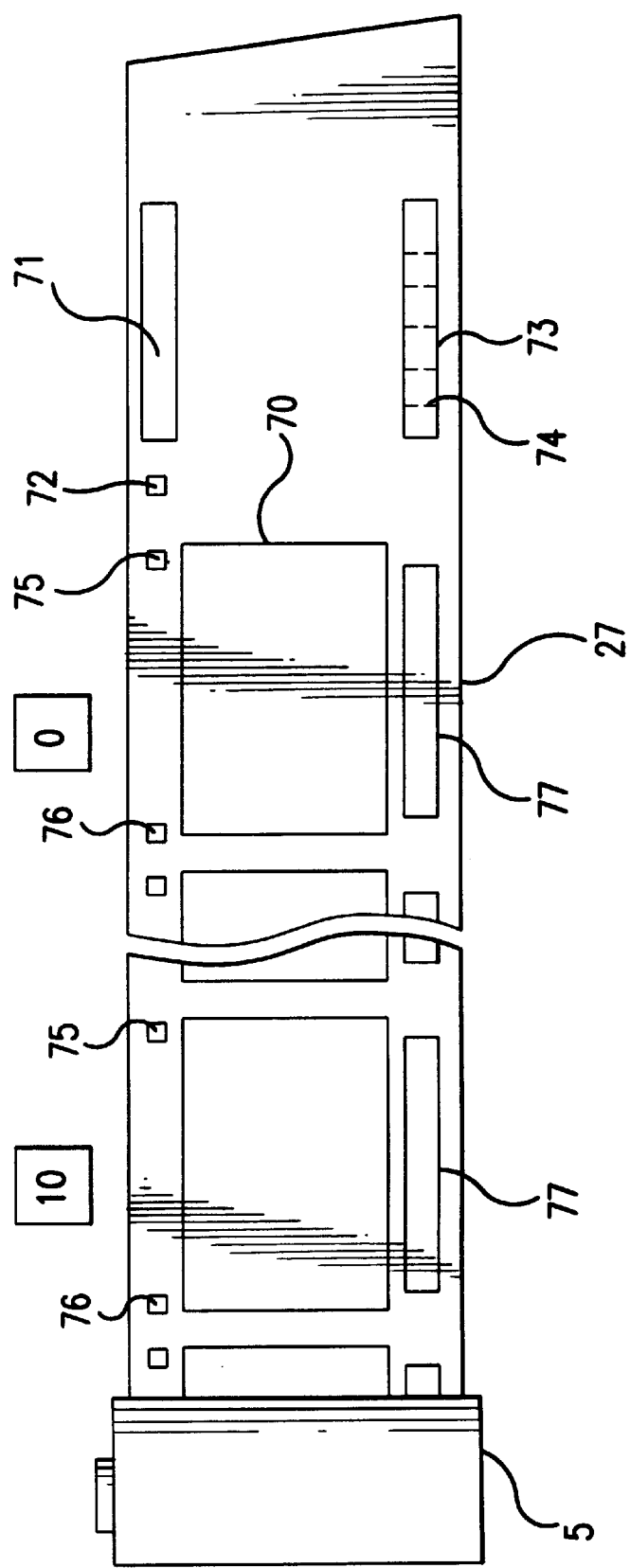
FIG. 3 is an outer view of long-type film (roll film)

FIG. 3 is an outer view of the roll film 27. The roll film 27 in FIG. 3 is shown in the state of being fed out from the cartridge 5.

As shown in FIG. 3, the roll film 27 includes a prescribed region, or lead, at a distal end (the end that is pulled out) section. Following the lead, image storage regions 70 are provided in each frame, placed at prescribed intervals. Magnetic storage regions 71 and perforations 72, on one end side of a width direction of the roll film 27, are provided in the lead. The lead of the roll film 27 also contains a magnetic storage region 73 and a bar code 74 on another end side in the width direction of the roll film 27.

In each frame, two perforations 75 and 76 are provided on an outside of one end of the film width direction of the image storage region 70. Further, in each frame, a magnetic storage region 77 is provided on the outside of the other end of the film width direction of the image storage region 70.

Film information of the roll film 27 is stored in the magnetic storage regions 71 and 73. By varying density, the bar code 74 displays the film information of the film. The film information includes the type or variety of the film, the frame number and the total number of frames. The film type includes color film, monochrome film, positive film, and negative film, for example.

The information relating to photography, such as the frame number, title, photographic date/time, photographic item, designated print size, is also recorded in each magnetic storage region 77. These data can be written in during photography and during development. In addition, data concerning the maker of the film is often written into the magnetic storage regions 71 and 73 of the lead before shipping.

As described above, the print sizes include the high vision size (H size), the classic size (C size), and the panorama size (P size). As for the aspect ratios, the H size is 16:9, the C size is 3:2, and the P size is 3:1.

Figure 4:
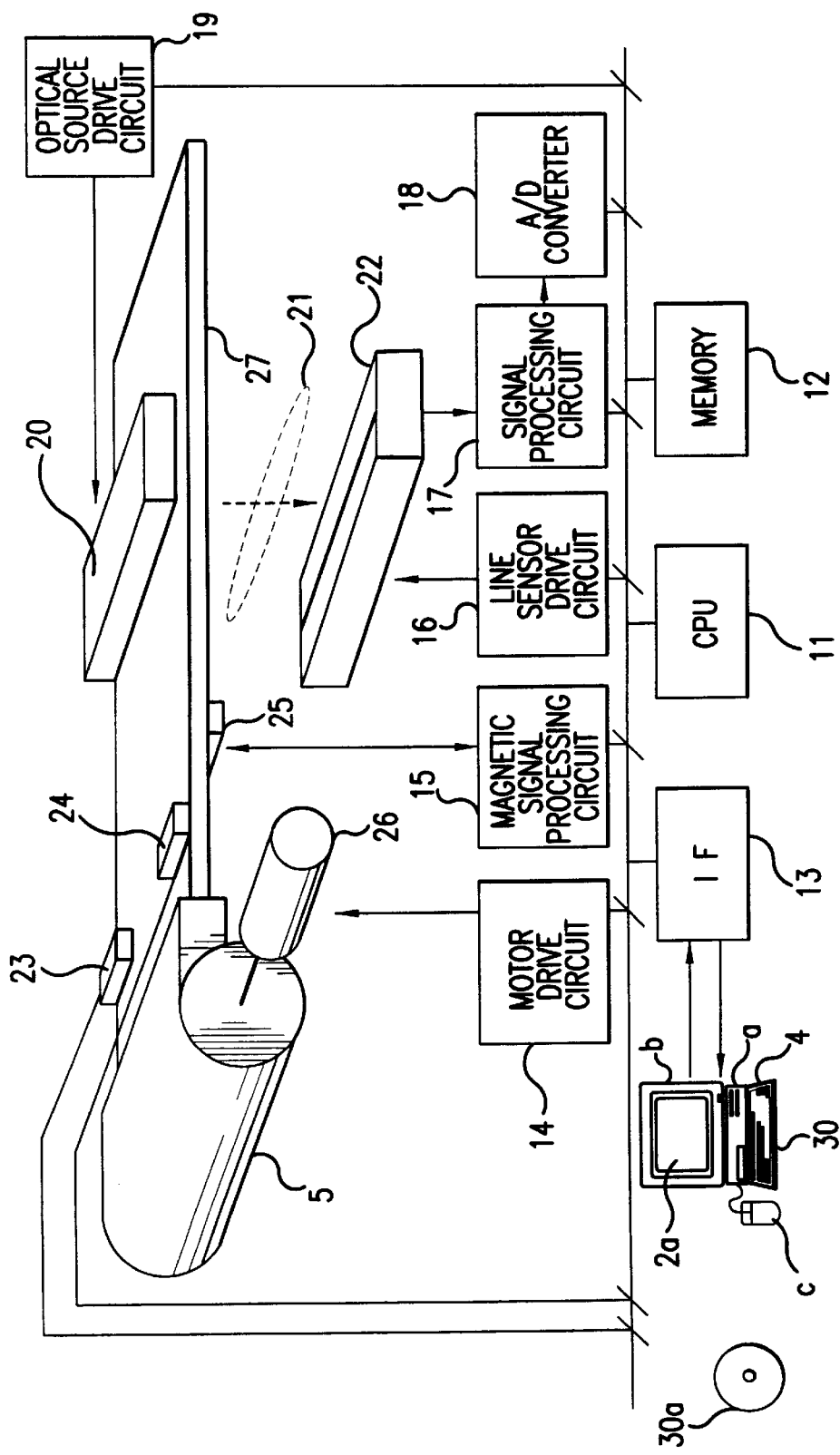
FIG. 4 shows an image reading system of one embodiment of the present invention.

Next, FIG. 4 shows the composition of an image reading system of one embodiment of the present invention. FIG. 4 shows the film image reading device 1. The film image reading device 1 is equipped with an installation chamber, in which the following may be provided: a CPU 11, a memory 12, an interface (IF) circuit 13, a motor drive circuit 14, a magnetic signal processing circuit 15, a line sensor drive circuit 16, a signal processing circuit 17, an A/D converter circuit 18, an optical source drive circuit 19, an optical source 20, a lens 21, a line sensor 22, an original document position detection sensor 23, an optical information reading sensor 24, a magnetic head 25, a motor 26 and a cartridge 5. The film image reading device 1 is also equipped with a feed path of the roll film 27, which is wound out from the cartridge 5.

The host computer 30 is equipped with a computer device a and a display device b including a monitor screen 2a, which is used as an output device. The host computer 30 may also include a keyboard 4 and a mouse c, which are used as input devices. The film image reading device 1 is connected to the host computer 30 via the IF circuit 13.

Further, the control program of the host computer 30 in the above embodiment is stored in the hard disk drive, which is a memory medium. The control program stored in hard disk may also be found in a memory medium 30a such as a CD-ROM, for example, so that it can be set up in the host computer 30 in advance.

It is also appropriate to use the CPU 11 of the image reading device instead of a central processing unit of the host computer 30. Moreover, it is appropriate to use the memory 12 of the image reading device instead of a memory of the host computer 30. In this case, it is acceptable to store a program that is identical to a program of the host computer 30 in ROM (program memory). By reading out the program stored in ROM to the working memory, it is possible for the CPU 11 of the film image reading device 1 to perform the execution of the program.

Next is a summary of the general operation of the image reading system shown in FIGS. 1–4. The user installs the cartridge 5 into the installation chamber of the film image reading device 1. Then the spool of the cartridge 5 is connected to an axle of the motor 26.

The user then closes a lid of the installation chamber. When this is done, an electrical power source is supplied to each circuit of the film image reading device 1, and each circuit is activated.

The user inputs a read command using the keyboard 4 or the mouse c and the host computer 30 sends a read operation command to the CPU 11 via the IF circuit 13. As a result, the CPU 11 initiates the control operation of each part. The motor drive circuit 14, based on commands from the CPU 11, controls the starting and stopping and the rotational speed and direction of the motor 26. When the motor 26 is driven in a forward direction, the roll film 27 is wound out to the feed path from the cartridge 5. When the motor 26 is driven in a reverse direction, the roll film 27 is wound in to the cartridge 5 from the feed path.

The original document position detection sensor 23 optically detects each perforation 75 and 76, and provides that information to the CPU 11. The optical information reading sensor 24 reads the film information of the bar code 74, and provides it to the CPU 11.

The magnetic head 25, under the control of the magnetic signal processing circuit 15, reads the magnetic information of the magnetic storage regions 71, 73, and 77, and provides the magnetic information to the CPU 11. Further, the magnetic head 25, under the control of the magnetic signal processing circuit 15, writes information to the magnetic storage regions 71, 73, and 77.

The magnetic signal processing circuit 15, under the control of the CPU 11, digitizes the magnetic information read by the magnetic head 25, and provides it to the CPU 11. Further, the magnetic signal processing circuit 15, under the control of the CPU 11, provides the information written into the magnetic storage regions 71, 73, and 77 to the magnetic head 25.

The light source 20, under the control of the light source drive circuit 19, illuminates one surface of the roll film 27. The optical source 20 may be equipped with three colors, such as R (red), G (green), and blue (B), of light-emitting diodes (referred to below as "LED"). In this case, the optical source drive circuit 19, according to the command from the CPU 11, performs control of the changeover lighting/extinguishing of the tri-colored LED of the optical source 20.

The optical source 20 may also be a white light. In this case, the optical source 20 is equipped with three color filters, such as R (red), G (green), and B (blue). When three color filters are provided, a changeover mechanism for the three filters is required.

The lens 21 is arranged for light of the optical source 20, which has passed through the roll film 27, to be resolved on the light receptor surface of the line sensor 22. The line sensor 22 is equipped with a feeding part that feeds the charge accumulated in each image accumulation part, which is a plurality of photoelectric conversion parts arranged in a horizontal row. The line sensor 22 is arranged so that a plurality of the light receptor surfaces of the image accumulation parts are arranged in a horizontal row, orthogonal to the direction of motion of the roll film 27.

The image sensor 22 can be a black and white image sensor or a color image sensor. When the black and white image sensor is used, the optical source 20 may be equipped with either the tricolored LED or the white light. When the color image sensor is used, the optical source 20 is the white light.

The line sensor drive circuit 16, based on commands from the CPU 11, controls the accumulation operation/ accumulation time of the line sensor 22. The line sensor drive circuit 16 also controls the main scanning in which the accumulated charge (image signal/electrical signal) is swept out to the signal processing circuit 17.

The signal processing circuit 17, based on commands from the CPU 11, amplifies the signal from the line sensor 22, performs signal processing, and provides the signal to the A/D converter 18. Processing, such as correlated double sampling (CDS), shading correction, dark current correction, and even/odd correction is included in the signal processing.

The A/D converter 18 converts the image signal sent from the signal processing circuit 17 into a digital signal of a prescribed bit number, and provides the digital signal to the CPU 11. The bit width is 8 bits, for example.

The CPU 11, based on a program set in the memory 12, performs the following control operation. First, the CPU 11 controls the motor drive circuit 14, the magnetic signal processing circuit 15, the line sensor drive circuit 16, and the optical source drive circuit 19, and reads the roll film 27. Next, the CPU 11 sets the accumulation time, according to the exposure information obtained from the host computer 30.

The CPU 11 then receives the output of either the original document position detection sensor 23 or the optical information reading sensor 24, and performs position detection of the perforation and deciphering of the content of the bar code.

The CPU 11 also controls the magnetic signal processing circuit 15, the signal processing circuit 17, and the A/D converter 18, and reads the read magnetic information and the film image, and stores them in the memory 12. Next, the CPU 11 takes one frame's worth or a plurality of frames' worth of line data (image data) that has been read, and stores the information in the memory 12 as the three colors of line data (image data) of R, G, and B.

The CPU 11 then takes one frame's worth or a plurality of frames' worth of line data (image data) that has been read, and stores the information in the memory 12 as the line data (image data) of one color, from among the three colors of R, G, and B. Finally, the CPU 11 obtains image data set by the user on the monitor screen 2a, from the host computer 30 via the IF circuit 13.

The memory 12 is a program memory and a working memory. The IF circuit 13 of this embodiment is an SCSI (Small Computer System Interface). The IF circuit 13 outputs line data (image data) stored in the memory 12 to the host computer 30. Further, the IF circuit 13 outputs line data (image data) stored in the memory 12 to the host computer 30. Finally, the IF circuit 13 provides the order, on the monitor screen 2a, of each type of frame designation that is sent from the host computer 30, to the CPU 11.

The host computer 30 displays the image data received from the IF circuit 13 on the monitor screen 2a. The host computer 30 also provides the command input from the keyboard 4 or the mouse c to the IF circuit 13.

The operation of the image reading system of an embodiment of the present invention will now be described with reference to FIGS. 5–19. In this description, the film image reading device is called the "scanner".

Figure 5:
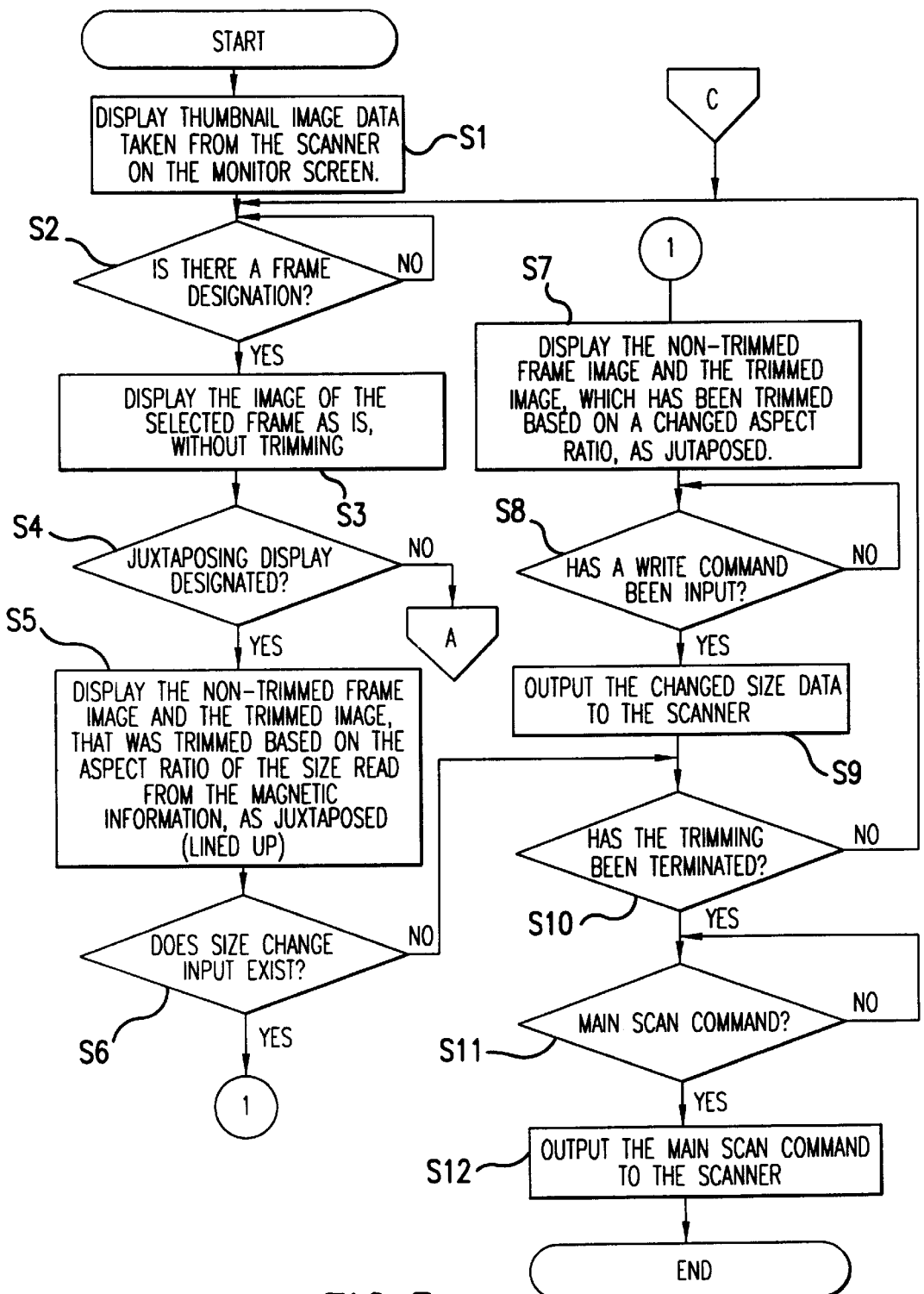
FIG. 5 is an operation flow chart of the juxtaposing display method of one embodiment of the present invention.
Figure 6:
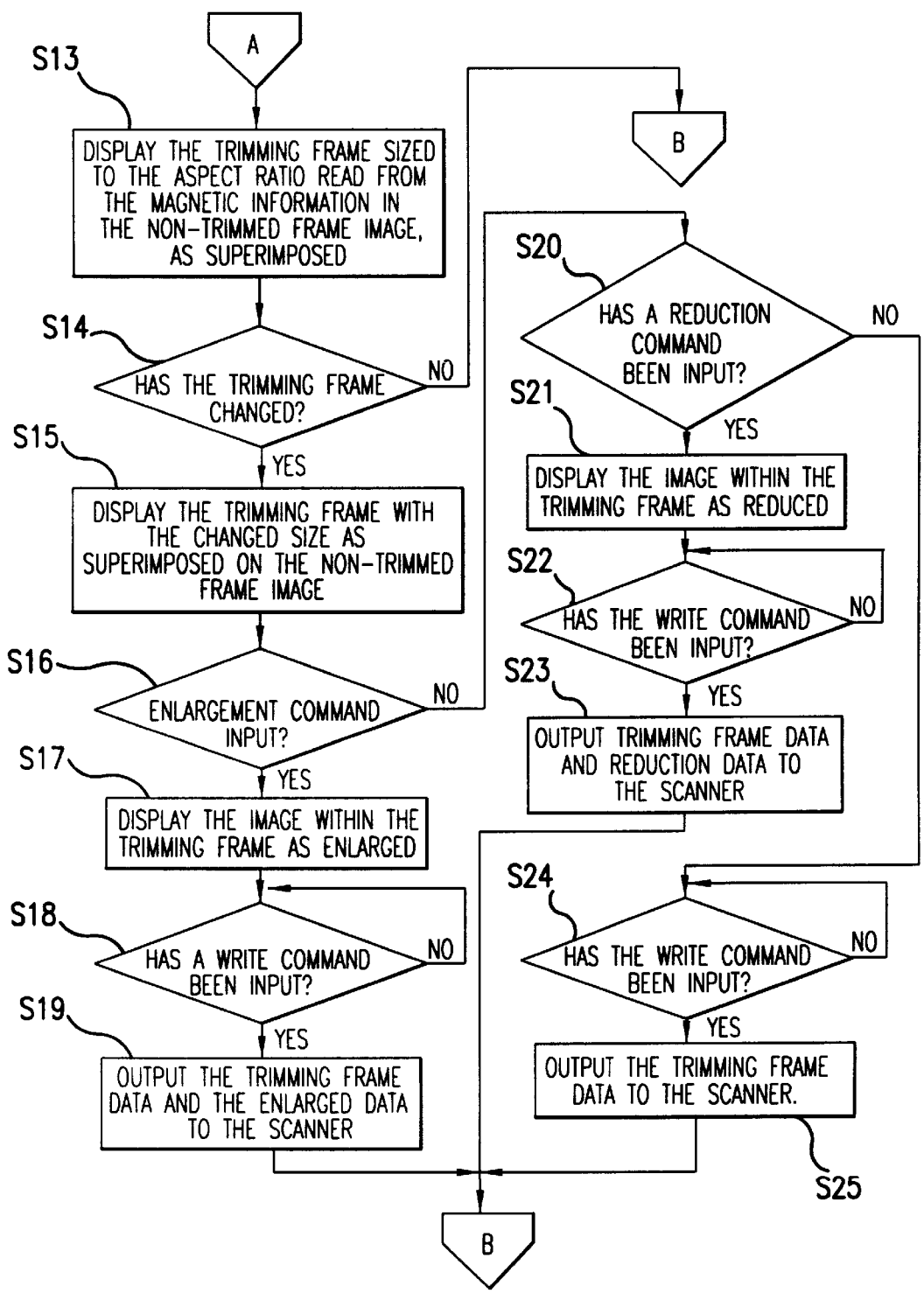
FIG. 6 is an operation flow chart of a superimposing display method of one embodiment of the present invention.
Figure 7:
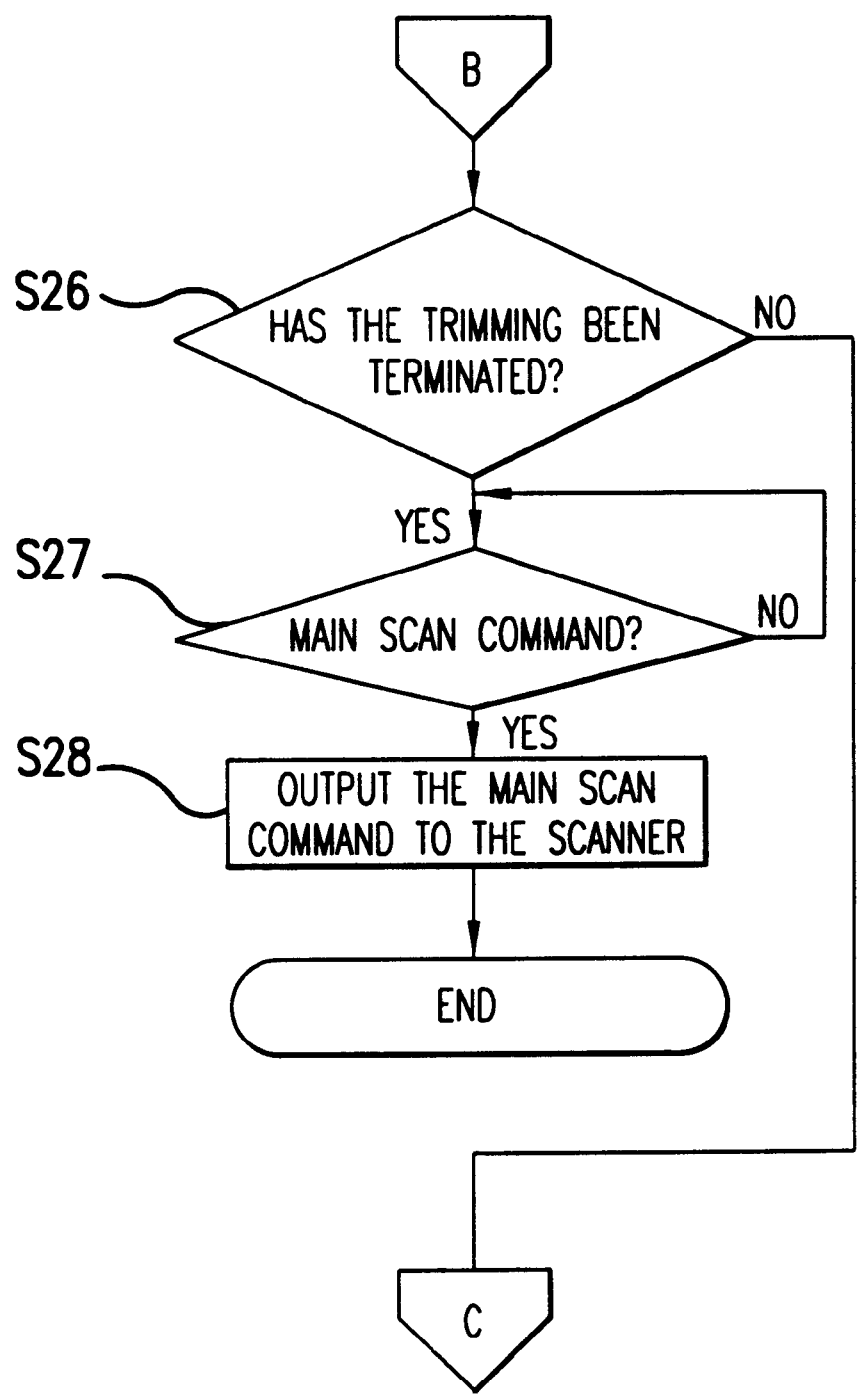
FIG. 7 is an operation flow chart of the superimposing display method of one embodiment of the present invention.
Figure 8:
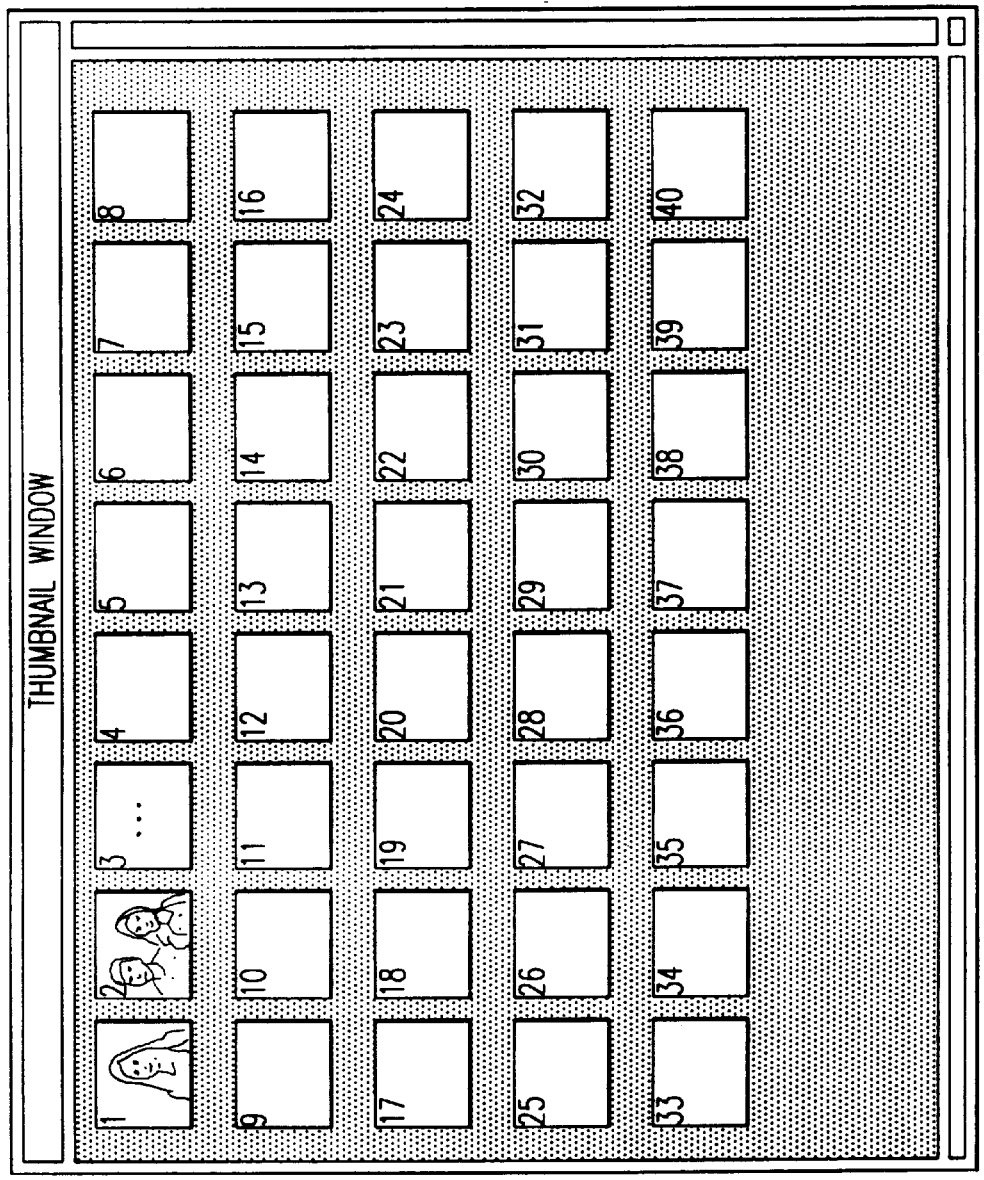
FIG. 8 shows a display example of a thumbnail window (thumbnail screen)

FIGS. 5–7 are flow charts of the operation of the display method of one embodiment. FIG. 8 is an example of the display of the Thumbnail Window (thumbnail screen). FIGS. 9–13 are examples of the display of the Preview Window (preview screen). FIGS. 14–19 are flow charts of the operation of another embodiment.

Figure 14:
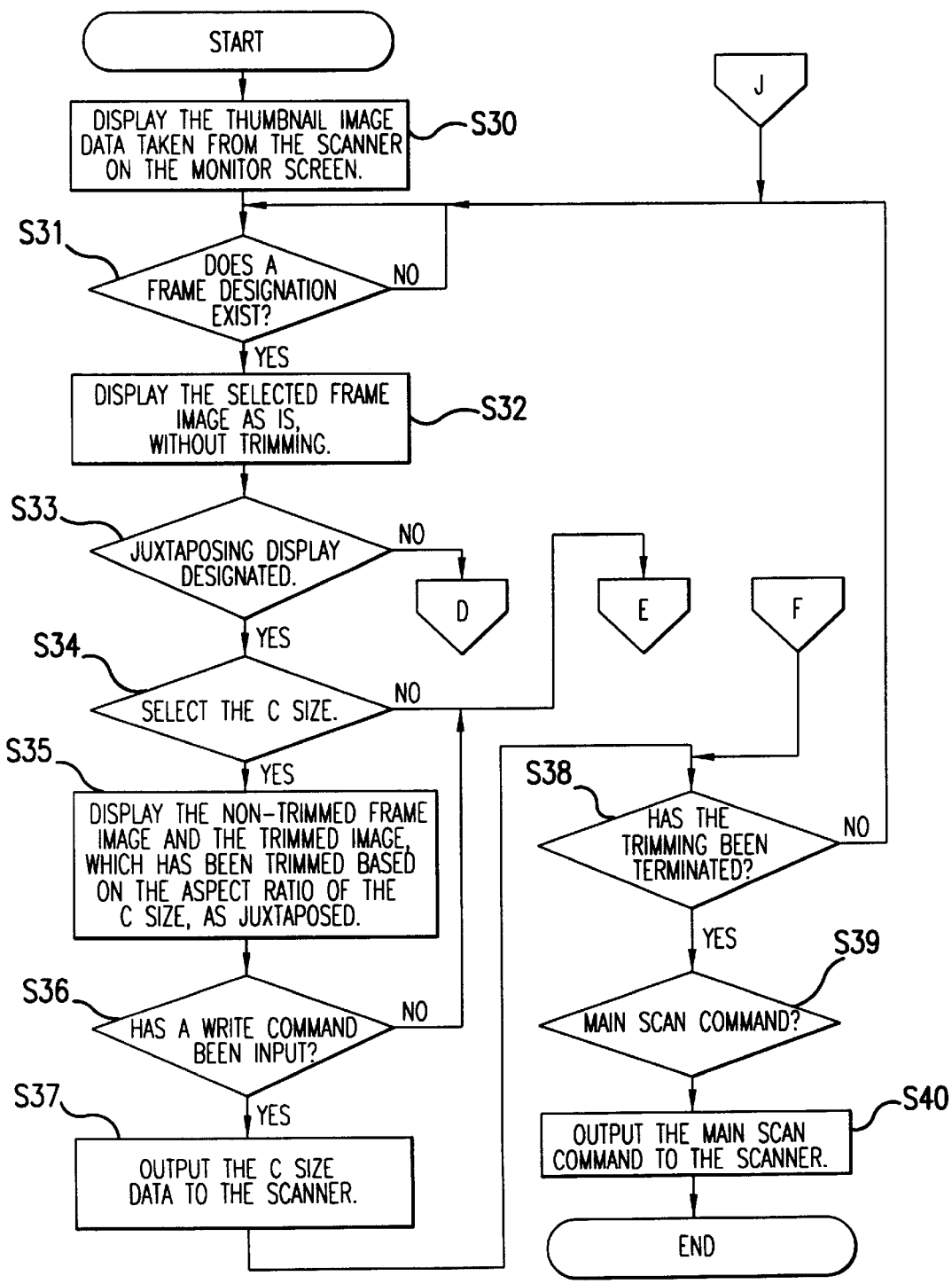
FIG. 14 is an operation flow chart of the juxtaposing display method of one embodiment of the present invention.
Figure 15:
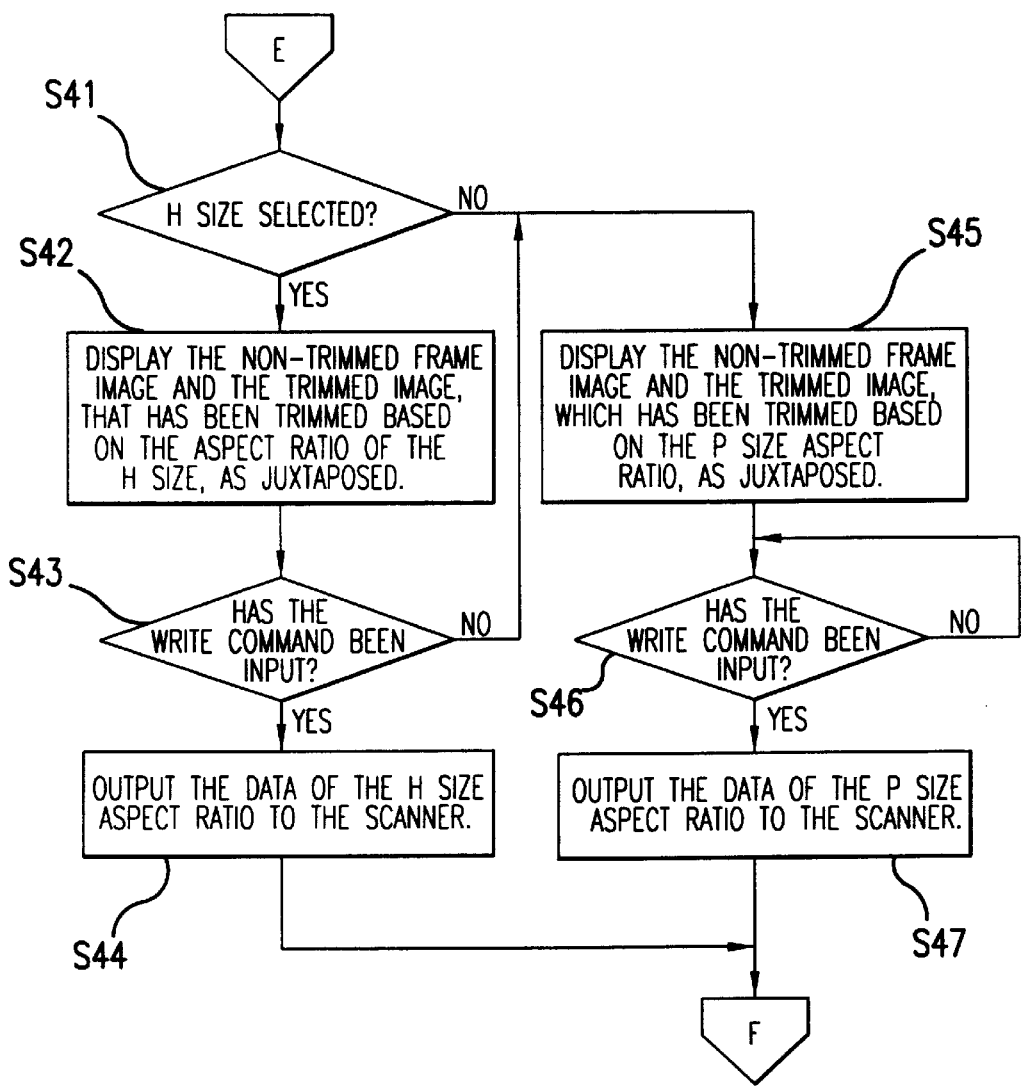
FIG. 15 is an operation flow chart of the juxtaposing display method of one embodiment of the present invention.

FIGS. 5, 14 and 15 relate to a juxtaposed display method, displaying two images as juxtaposed (lined up). FIGS. 6, 7 and 16–19 relate to a superimposing display method that displays the trimming frame superimposed on the original image.

The operation of the display method of the first embodiment is described with reference to FIG. 5. In step S1 the host computer 30 outputs a "pre-scan command" to the scanner.

The CPU 11 of the scanner receives the "pre-scan command," controls the line sensor 22, and reads the reading of the image of all of the frames of the roll film 27 and the magnetic information of the magnetic storage region 77 of each frame, and outputs the information to the host computer 30. In this way, the host computer 30 obtains the image data (thumbnail image data) of all the frames, and the magnetic information of each frame, of the roll film 27, and displays the thumbnail window on the monitor screen 2a.

The thumbnail window, as shown in FIG. 8, is a window in which images of all the frames of the roll film 27 can be displayed. The user can perform a trimming process on each frame on this thumbnail window, as described below.

The user can designate some or all the frames for trimming. The user designates the frame by clicking on the frame number using the keyboard 4, or the user selects the frame number part or image part using the mouse c.

In step S2, the host computer 30 determines if the user has designated a frame. If the user has designated a frame, the control program advances to step S3. Otherwise the control program remains at step S2.

Figure 9:
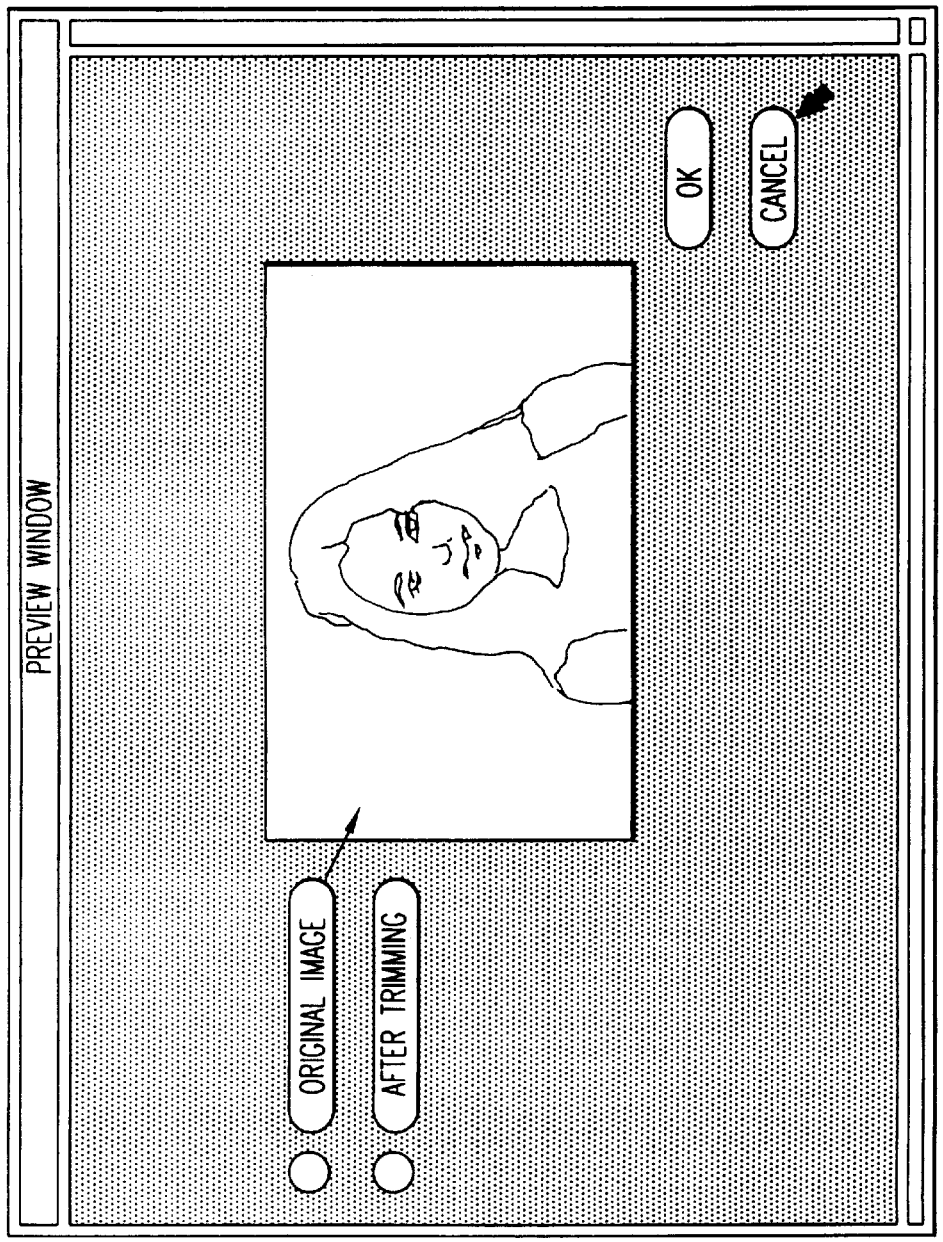
FIG. 9 shows a display example of a preview window (preview screen)

In step S3, the host computer 30 displays the image of the selected frame as is, without trimming, in the preview window as shown in FIG. 9. In prior image reading systems, the image of a preview window was trimmed according to the aspect ratio determined by the print size included in the magnetic information. In this embodiment, the print size included in the magnetic information is ignored, and the frame image obtained from the scanner is displayed "as is" (the original image) as a first image. The control program then proceeds to step S4.

In step S4, the host computer determines if the juxtaposed display method is selected. If the juxtaposed display method is selected, the control program advances to step S5. Otherwise, the control program jumps to step S13, as shown in FIG. 6.

Figure 10:
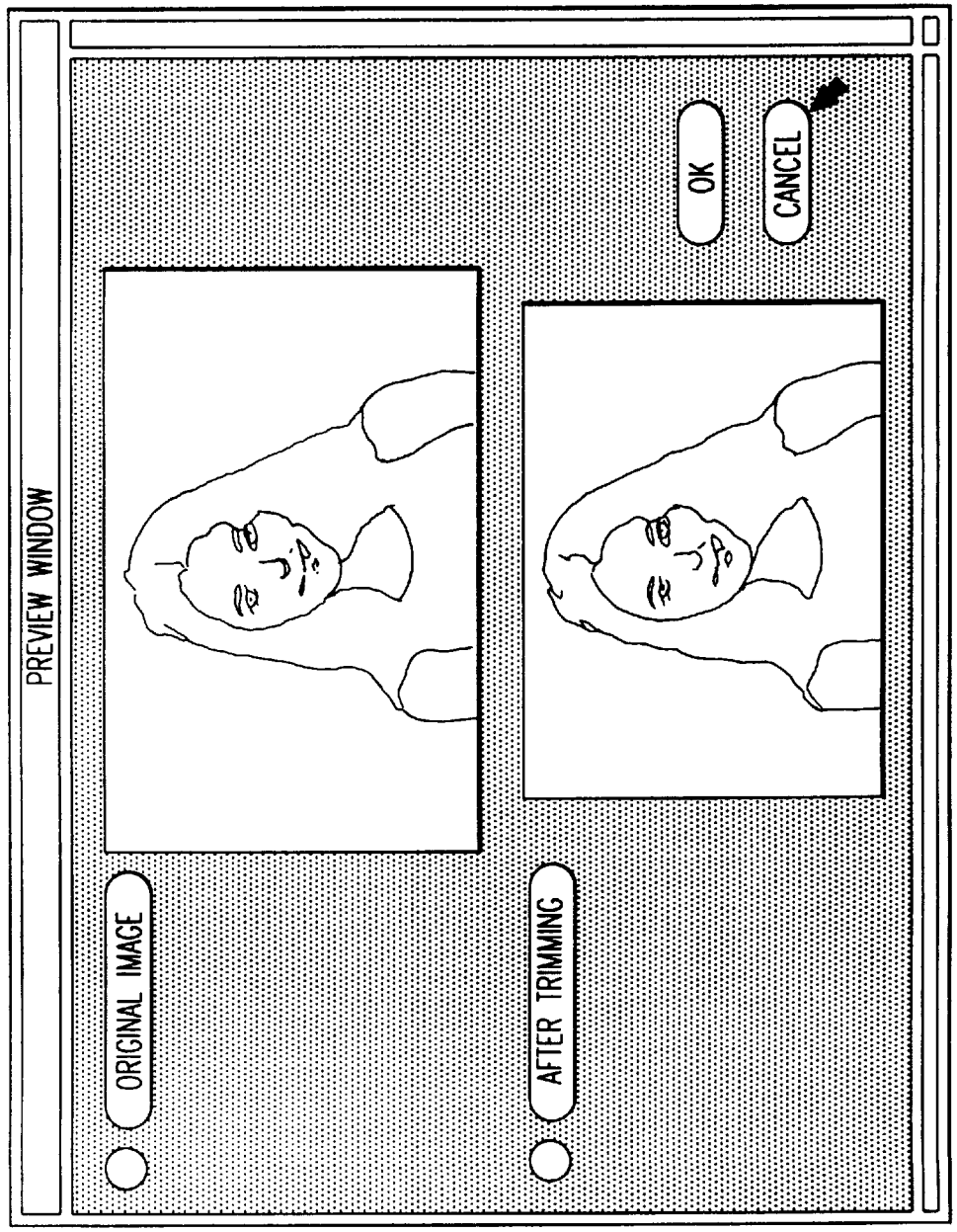
FIG. 10 shows a display example of a preview window (preview screen)

In step S5, the host computer 30 displays the frame image shown in FIG. 9, in which the trimming process has not been executed. The host computer 30 also displays a second image in which the trimming process has been completed based on the aspect ratio of the print size read from the magnetic information. The frame image and the second image are juxtaposed in the preview window as shown in FIG. 10.

Accordingly, the user can compare the image trimmed according to the aspect ratio of the print size set during photography, and the original image, directly by sight. Further, the user can easily confirm the image of the final output image against the original image. The control program then proceeds to step S6.

In step S6, the host computer 30 determines if the user has changed the print size. If the user does not desire resetting of the display provided in step S5, then the user operates the "OK" button on the preview window. When the user operates the "OK" button, the host computer determines that the print size has not changed and the control program jumps to step S10.

In step S6, if the user selects a print size other than the print size set during photography, then the host computer 30 determines that the print size has changed. If the print size has changed, the control program proceeds to step S7.

In step S7, the host computer 30 displays the frame image, shown in FIG. 9, in which the trimming process has not been executed, and the second image. The second image has been trimmed, based on the aspect ratio of the print size to which the second image has been changed. The first and the second image are juxtaposed in the preview window, as shown in FIG. 10. The control program then proceeds to step S8.

In step S8, the host computer 30 determines if the user has input a write command. When the second image has been trimmed by the user according to the aspect ratio of the print size, the user can select the second image as a final print out image. The user selects the "OK" button to signify that the second image is the final output image. If the "OK" button has been selected, the host computer receives a write command to write the print size to the magnetic storage region of the scanner. The control program then proceeds to step S9. Otherwise, if the user operates the "CANCEL" button, the control program remains at step S8.

In step S9, the changed print size data are output to the scanner. The control program then proceeds to step S10. In step S10, the host computer 30 determines whether the trimming process is finished. If the trimming process will be performed for another frame as well, the user sets the thumbnail window as the window by operating the keyboard 4 or the mouse c. In this case, the host computer 30 makes a negative determination (NO) in step S10, and the control program returns to step S2. The trimming process is then performed as described above in steps S2–S9 for the next frame image.

If in step S10, the user terminates the trimming process, by operation of the keyboard 4 or the mouse c, the host computer 30 makes a positive determination (YES). The control program then advances to step S11.

In step S11, the host computer 30 determines if the user has input a main scan command. If the user inputs the main scan command, the control program advances to step S12. In step S12, the host computer 30 outputs a main scan command designating the frame for which the main scan is to be performed.

After the scanner reads the image of the designated frame and the magnetic information, the scanner outputs the information to the host computer 30. The trimming process can suitably be performed on the data of the print size that was reset. This data can be included in the magnetic information.

The scanner can output the image data, in which the trimming process is performed according to the aspect ratio of the print size in which this magnetic information is included, to the host computer 30. Or, the scanner outputs the image data of the designated frame and the magnetic information to the host computer 30, and the trimming process is performed according to the aspect ratio of the print size that the host computer 30 included in the magnetic information.

Figure 11:
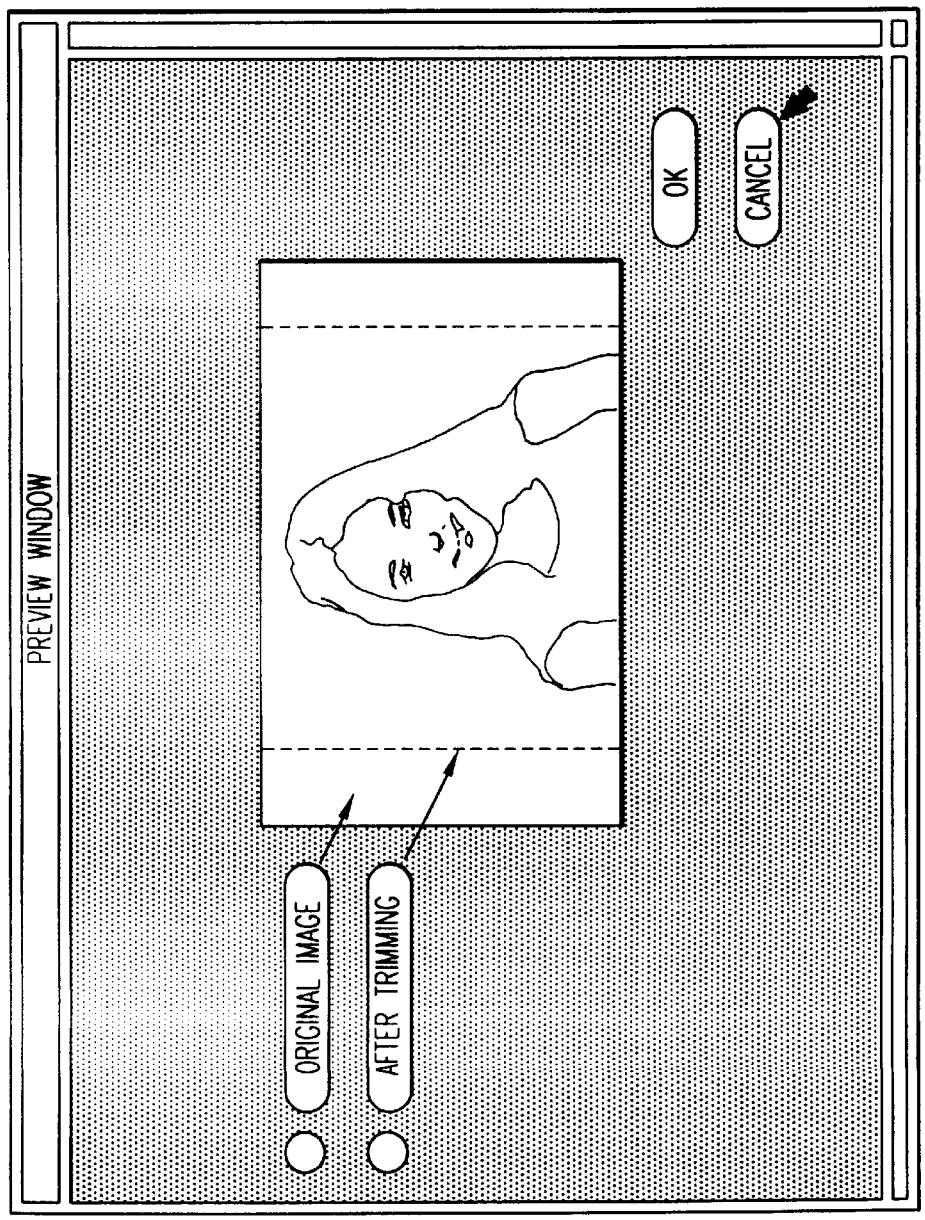
FIG. 11 shows a display example of a preview window (preview screen)

In step S13, the host computer 30 displays the trimming frame as superimposed, according to the aspect ratio of the print size read from the magnetic information in the frame image (first image), shown in FIG. 9. The untrimmed, superimposed frame is shown in FIG. 11. The control program then proceeds to step S14.

In the same way as in the case of the juxtaposed display shown in FIG. 10, the user can, by eye, directly confirm and compare the trimming frame, on the original image, according to the aspect ratio of the print size set during photography. Further, the user can easily confirm the image of the final output image corresponding to the original image.

In step S14, the host computer 30 determines whether the user has changed the print size. The user compares the trimming frame and the original image by sight, decides if the image size has been properly trimmed from the original image, and decides if resetting is desired.

The user operates the "OK" button of the preview window, when resetting is not desired with regard to the display of step S13. When the user operates the "OK" button, the host computer 30 performs the negative determination (NO) in step S14, and the control program jumps to step S26.

The user performs the input of the size designation without operating the "OK" button when resetting is desired with regard to the display of step S13. When the user selects another print size, the host computer 30 performs a positive determination (YES) in step S14, and the control program advances to step S15.

In step S15, the host computer 30 displays the trimming frame as superimposed, according to the aspect ratio of the selected print size, on the frame image shown in FIG. 9. For example, the user selects and inputs the P size. The host computer 30 then superimposes the trimming frame according to the aspect ratio of the altered print size P. The host computer 30 then displays the superimposed trimming frame as shown in FIG. 11. The control program then proceeds to step S16.

In step S16, the host computer determines if the user has input the enlargement command. If the user inputs the enlargement command, the control program proceeds to step S17. Otherwise, the control program jumps to step S20.

Figure 12:
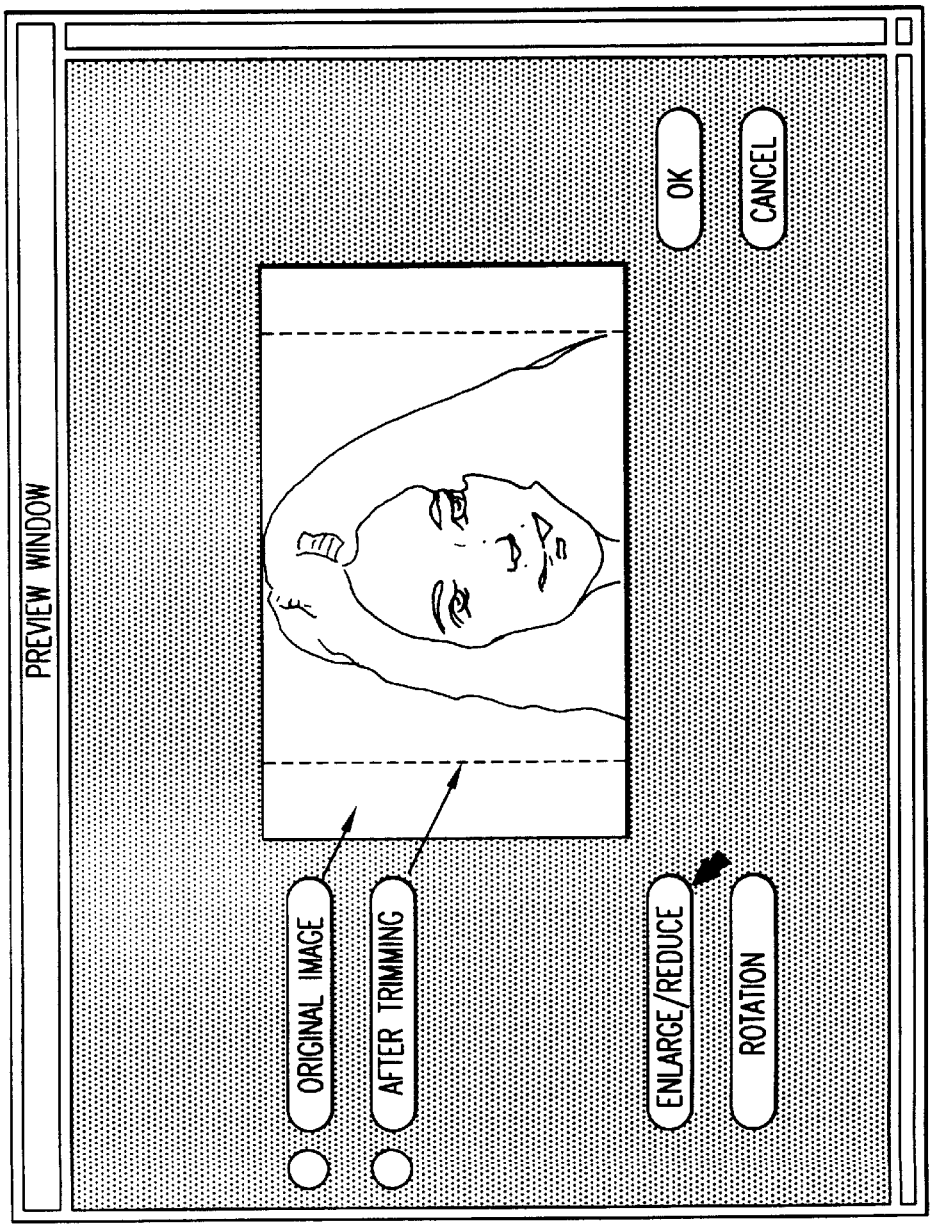
FIG. 12 shows a display example of a preview window (preview screen)
Figure 13:
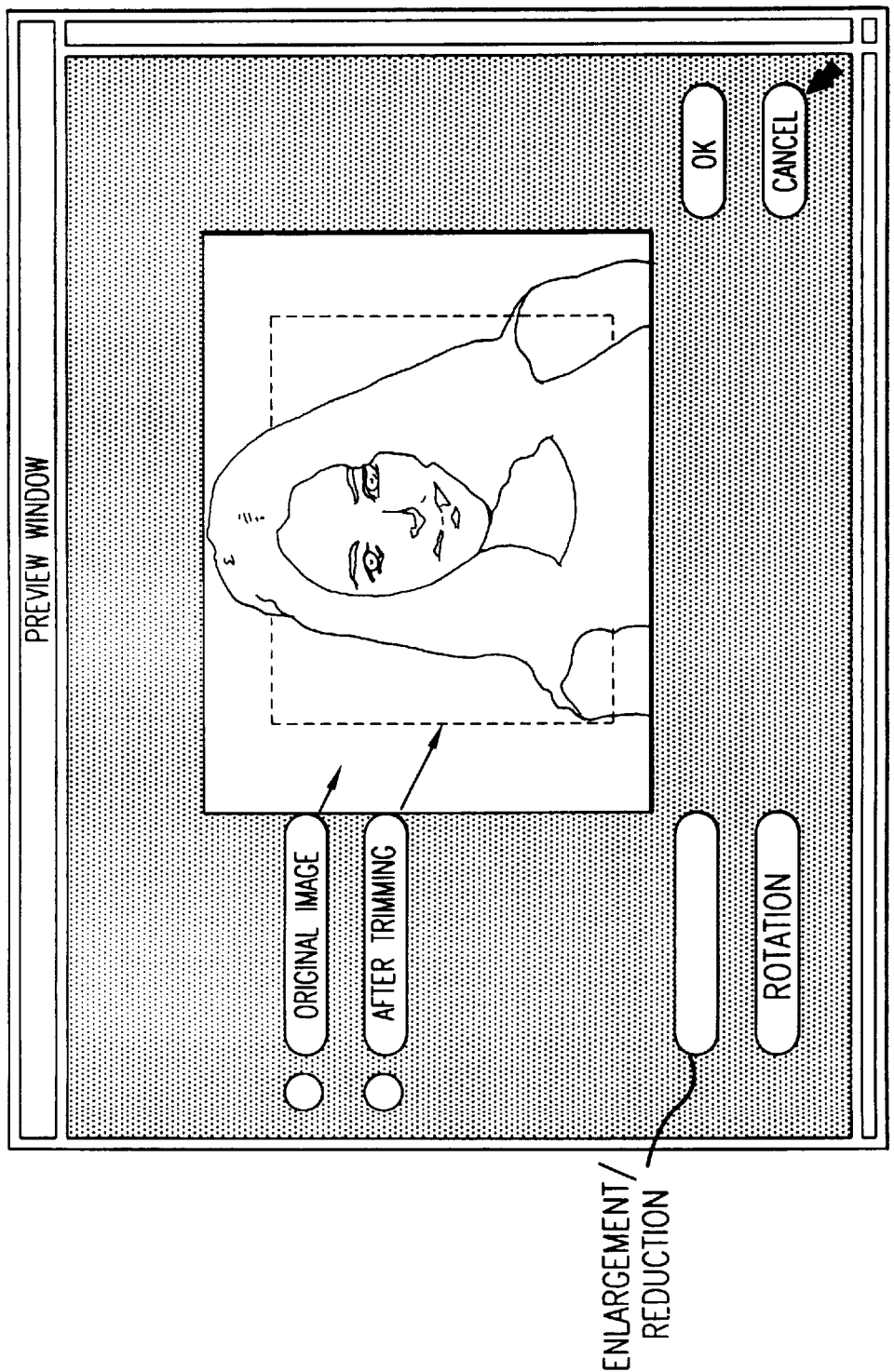
FIG. 13 shows a display example of a preview window (preview screen)

In step S17, the host computer 30 displays the corresponding image frame as enlarged, as shown in FIGS. 12 and 13. The control program then proceeds to step S18.

In step S18, the host computer 30 determines if the user has input the write command. If the user input the write command, the control program proceeds to step S19. Otherwise, the control program remains at step S18.

In step S19, the host computer 30 outputs the corresponding trimming frame data and the enlargement data to the scanner. In the scanner, the trimming frame data and the enlargement data are written to the magnetic storage region of the corresponding frame. The control program then jumps to step S26.

In step S20, the host computer 30 determines if the user inputs the reduction command. If the user inputs the reduction command, the control program proceeds to step S21. Otherwise, the control program jumps to step S24.

In step S21, the host computer 30 displays the reduced image in the corresponding trimming frame. The control program then proceeds to step S22.

In step S22, the host computer 30 determines if the user inputs the write command. The user inputs the write command by operating the "OK" button. If the user operates the "OK" button, the control program proceeds to step S23. Otherwise, if the user operates the "CANCEL" button, the control program remains at step S22.

In step S23, the host computer 30 outputs the corresponding trimming frame data and reduction data to the scanner. In the scanner, the trimming frame data and reduction data are written into the magnetic storage region 77 of the frame. The control program then jumps to step S26.

In step S24, the host computer 30 determines if the user inputs the write command. The user operates the "OK" button, signifying that the trimming frame as superimposed is desired, by operating the "OK" button. If the user operated the "OK" button, the control program advances to step S25.

In step S25, the host computer 30 outputs only the altered trimming frame data to the scanner. The control program then advances to step S26. In the scanner, the trimming frame data is written in to the magnetic storage region 77 of the corresponding frame.

In step S26, the host computer 30 determines whether trimming was terminated by the superimposing display method. When the determination is negative (NO) the control program returns to step S2, and the process is performed in the same way with regard to the following frame.

In step S26, when the determination is positive (YES) the control program proceeds to step S27. In step S27, the host computer 30 determines whether the user has input the main scan order. When the user inputs the main scan order, the control program advances to step S28.

The scanner then outputs a main scan command designating the frame in which the main scan is performed. The scanner then reads the image and the magnetic information of the designated frame, and outputs the information to the host computer 30. The resetting of the print size of the data, and the enlargement or reduction of the data is included in the magnetic information. The host computer 30 performs the trimming process according to the print size and enlargement or reduction data included in the magnetic information.

Next, the operation of the display method of the second embodiment is described by reference to FIG. 14. In step S30, the host computer 30, by a method similar to that in step S1, obtains the thumbnail image data and the magnetic information of each frame from the scanner, and displays a thumbnail window on the monitor screen 2a, as shown in FIG. 8. The control program then proceeds to step S31.

In step S31, the host computer 30 determines if the user has designated a frame. If the user has designated a frame, the control program advances to steps S32. Otherwise the control program remains at step S31.

In step S32, the host computer 30 displays the image of the selected frame on the preview window, without trimming, as shown in FIG. 9. The control program then proceeds to step S33.

In step S33, the host computer 30 awaits the selection designation input of the display method. In the display method, as described above, there is a juxtaposing display method and a superimposing display method.

In step S33, if the juxtaposing display method has been selected, the host computer 30 performs a positive (YES) determination, and the control program proceeds to step S34.

Figure 16:
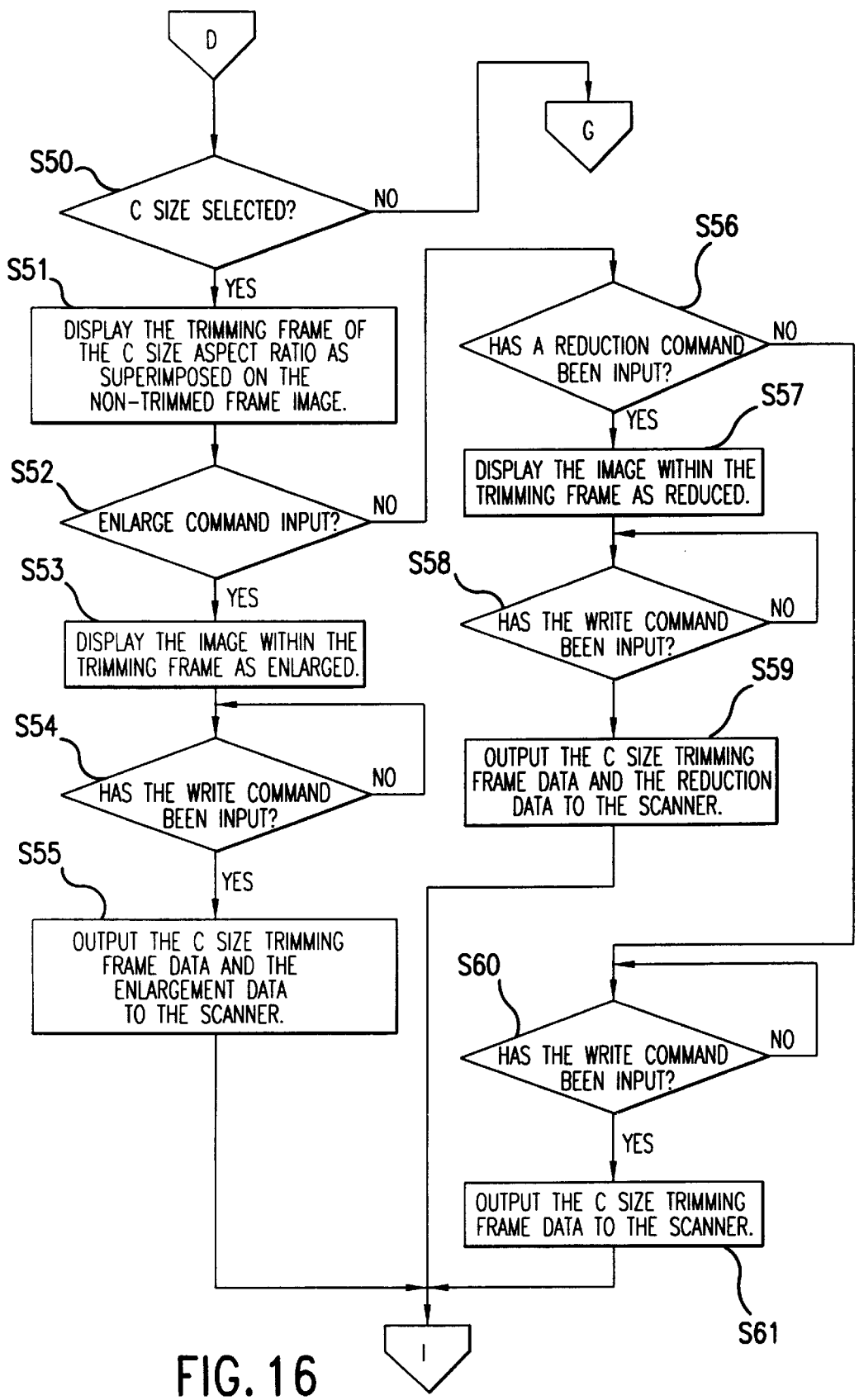
FIG. 16 is an operation flow chart of the superimposing display method of one embodiment of the present invention.

In step S33, if the superimposing display method has been selected, the host computer 30 performs a negative (NO)

determination and the control program proceeds to step S50, as shown in FIG. 16.

As noted above, the print sizes are the C size, H size, and P size. The user selects and inputs the three sizes in any order. In this second embodiment, for ease of explanation, the selection of the print sizes is that the C size is selected first, the H size is selected next, and the P size is selected last.

The juxtaposing display method is performed in the following manner. In step S34, the host computer 30 determines whether the C size has been selected. The control program advances to step S35 when the determination is positive (YES), and jumps to step S41 when the determination is negative (NO).

In step S35, the host computer 30 displays the frame image shown in FIG. 9, in which the trimming process has not been executed, and the image (the second image) in which the trimming process has been performed based on the aspect ratio of the selected print size C. The frame image and the second image are lined up in the preview window as shown in FIG. 10. The control program then proceeds to step S36.

In step S36, when satisfied with the trimming image, the user operates the "OK" button. When the user operates the "OK" button, the host computer 30 receives a command writing the C size data into the magnetic storage region 77 of the scanner. The control program then proceeds to step S37.

In step S37, the host computer 30 outputs the C size data to the scanner. In the scanner, the C size data is written into the magnetic storage region 77 of the frame. The control program then advances to step S38.

In step S36, if not satisfied with the trimming image, based on the aspect ratio of the print size C, the user operates the "CANCEL" button, and again performs the selection and input of the print size.

In step S41, the host computer 30 determines whether the H size has been selected. If the H size is selected, the control program advances to step S42. Otherwise, the control program jumps to step S45.

In step S42, the host computer 30 displays the frame image shown in FIG. 9, in which the trimming process is not executed, and the image (the second image) in which the trimming process is performed, based on the aspect ratio of the selected print size H. The frame image and the second image are lined up in the preview window as shown in FIG. 10. The control program then proceeds to step S43.

In step S43, when satisfied with the trimming image, based on the aspect ratio of the print size H, the user operates the "OK" button. When the user operates the "OK" button, the host computer 30 receives a command to write the H size data into the magnetic storage region 77 of the scanner. In step S43, if the host computer 30 receives a write command, the control program proceeds to step S44.

In step S44, the host computer 30 outputs the H size data to the scanner. In the scanner, the H size data is written into the magnetic storage region 77 of this frame. The control program then returns to step S38.

In step S43, if not satisfied with the trimming image, based on the, aspect ratio of the print size H, the user operates the "CANCEL" button and again performs selection and input of the print size. When the user operates the "CANCEL" button in step S43, the control program then advances to step S45.

In step S45, the host computer 30, because the P size has been selected, displays the frame image shown in FIG. 9, in which the trimming process is not executed. The host computer 30 also displays the image (second image) in which the trimming process is performed, based on the aspect ratio of the selected print size P. The frame image and the second image are lined up in the preview window as shown in FIG. 10. The control program then proceeds to step S46.

In step S46, when satisfied with the trimming image, based on the aspect ratio of the print size P, the user operates the "OK" button. When the user operates the "OK" button in step S46, the host computer 30 receives a command to write the P size data in to the magnetic storage region 77 of the scanner. In step S46, if the host computer 30 receives a write command, the control program proceeds to step S47.

In step S47, the host computer 30 outputs the P size data to the scanner. In the scanner, the P size data is written into the magnetic storage region 77 of the frame concerned. The program then returns to step S38.

Because the main scan steps (steps S38, S39, and S40) after the trimming process, according to the juxtaposing display, proceed in the same way as in the main scan steps (steps S10, S11, and S12) that are described in the first embodiment, their explanation is omitted.

The user can easily reset the trimming image and the original image in which trimming is not performed, by direct comparison according to the aspect ratio of the selected size, in the same way as in the juxtaposing display method of the first embodiment. Thus, as described above, it is possible to easily obtain the desired trimming image in the juxtaposing display method of this second embodiment.

Next, the superimposing display method when the determination of step S33 is negative (NO) is described by reference to FIG. 16.

Figure 17:
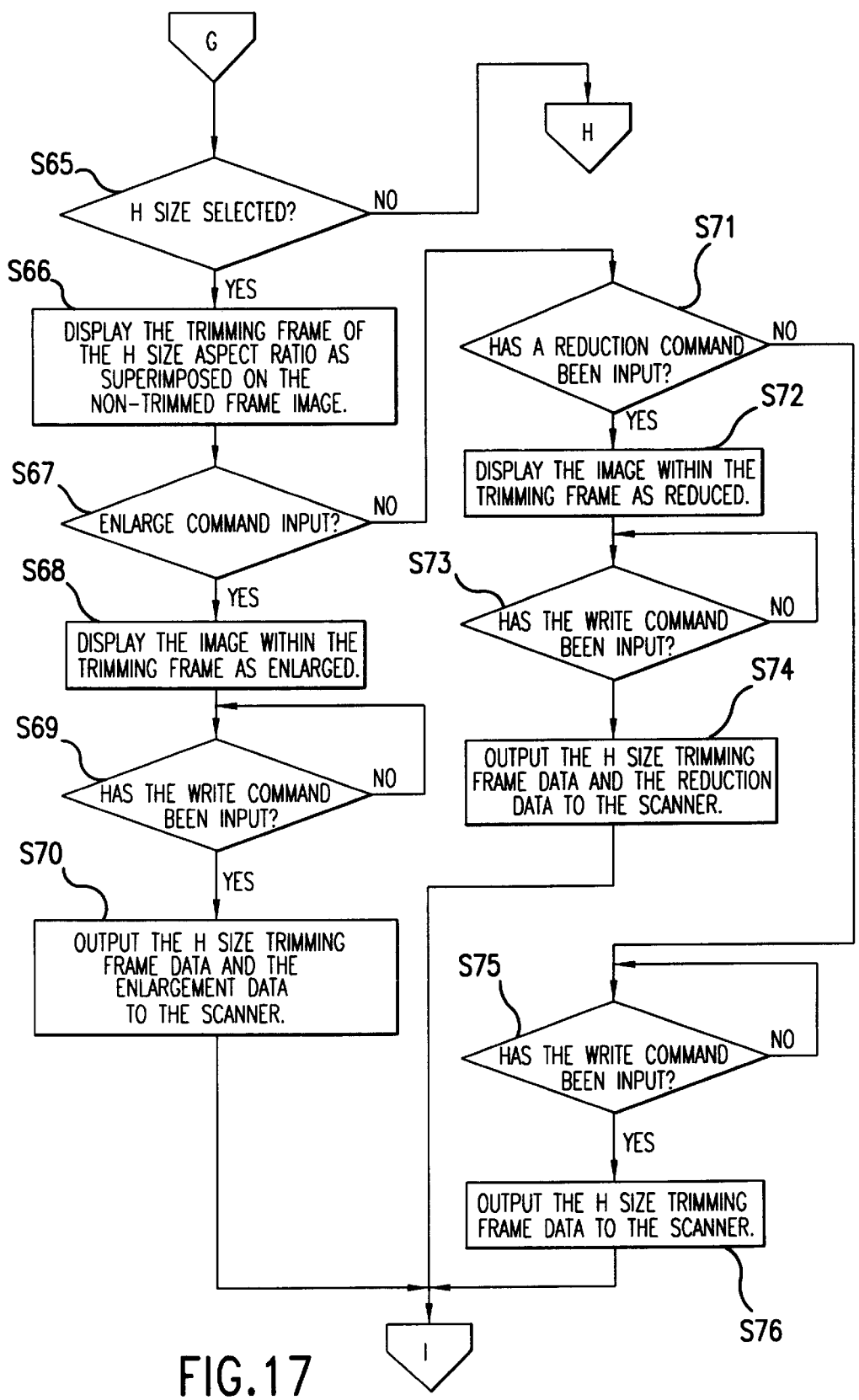
FIG. 17 is an operation flow chart of the superimposing display method of one embodiment of the present invention.

In step S50, the host computer 30 determines whether the C size is selected. When the C size is selected, the control program proceeds to step S51. Otherwise, the control program jumps to step S65, as shown in FIG. 17.

In step S51, the host computer 30 superimposes the trimming frame of the C size aspect ratio on the non-trimmed frame image and displays the superimposed images. The non-trimmed frame image (the first image) is shown in FIG. 9. The superimposed display is shown in FIG. 11. The control program then proceeds to step S52.

In step S52, the host computer 30 determines if the user has input an enlargement command. If the user has input an enlargement command, the control program proceeds to step S53. Otherwise, the control program jumps to step S56.

In step S53, the host computer 30 displays the image enlarged within the C size trimming frame, as shown in FIGS. 12 and 13. The control program then advances to step S54.

In step S54, the host computer 30 determines if the user has input a write command. The user inputs a write command by operating the "OK" button. If the user operates the "OK" button, the control program advances to step S55.

In step S55, the host computer 30 outputs the C size trimming window data and the enlargement data to the scanner. In the scanner, the C size trimming frame data and the enlargement data are written into the magnetic storage region 77 of the frame. The control program then jumps to step S95.

In step S56, the host computer 30 determines if the user has input the image reduction command. If the user has input the image reduction command, the control program proceeds to step S57. Otherwise, the control program jumps to step S60.

In step S57, the host computer 30 displays the reduced size image. The control program then advances to step S58. In step S58, the host computer 30 determines if the user has input a write command. The user inputs a write command by operating the "OK" button. If the user operates the "OK" button, the control program advances to step S59.

In step S59, the host computer 30 outputs the C size trimming frame data and the reduction data to the scanner. In the scanner, the C size trimming frame data and the reduction data are written to the magnetic storage region 77 of the frame. The control program then jumps to step S95.

In step S60, the host computer 30 determines if the user has input a write command. If the user inputs a write command, the control program advances to step S61.

In step S61, the host computer 30 outputs the C size trimming frame data to the scanner. In the scanner, the C size trimming frame data is written into the magnetic storage region 77 of the frame. The control program then jumps to step S95.

Figure 18:
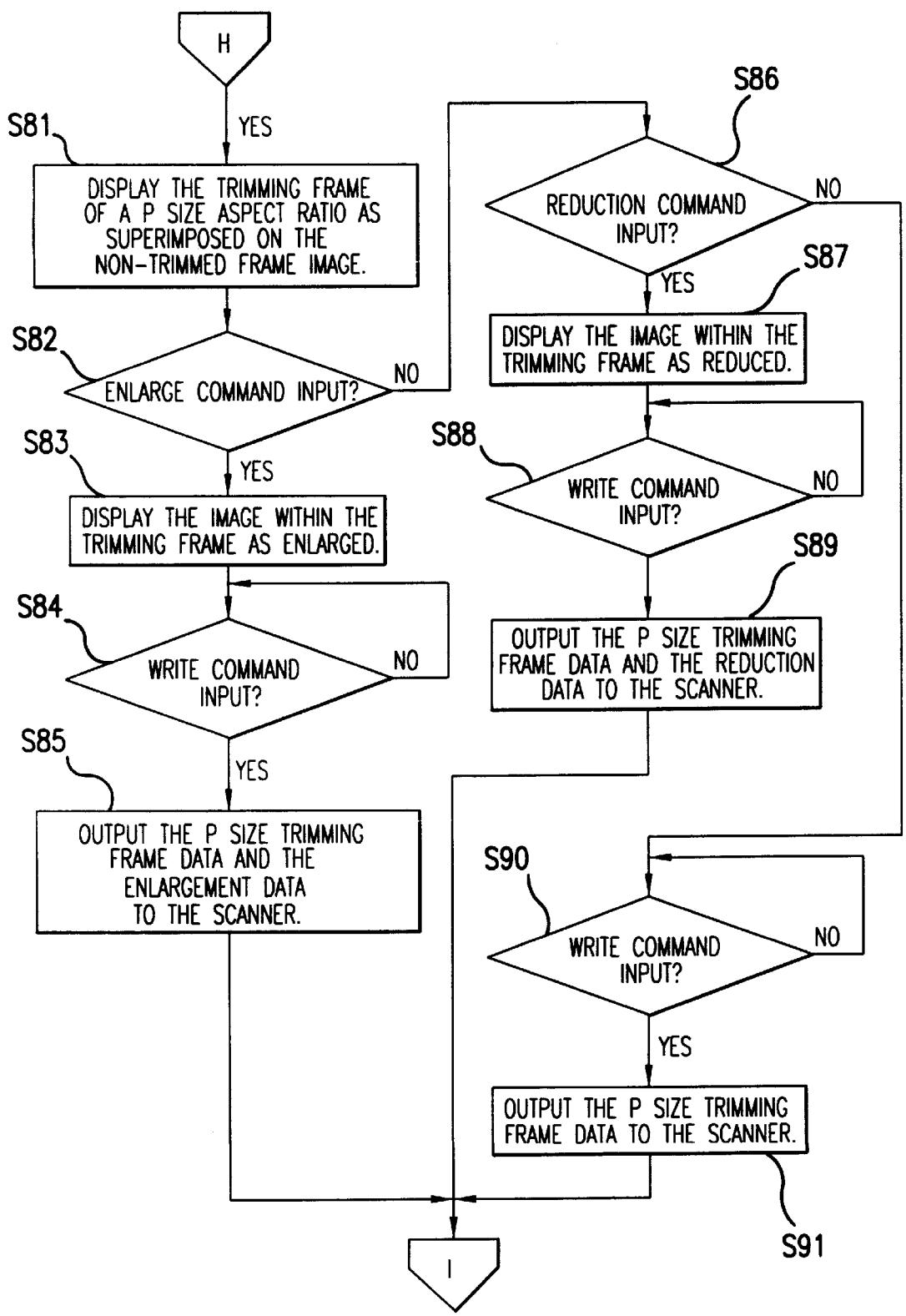
FIG. 18 is an operation flow chart of the superimposing display method of one embodiment of the present invention.
Figure 19:
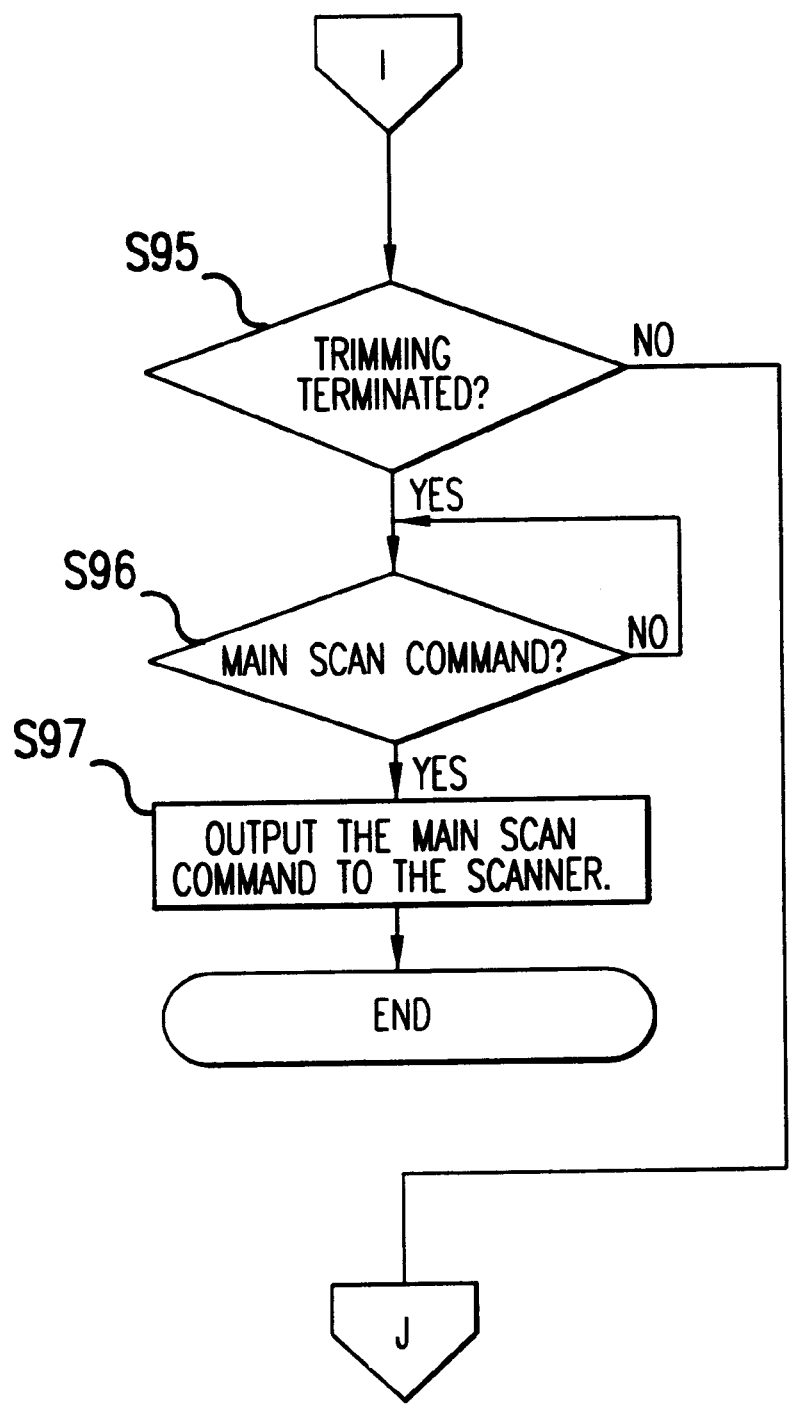
FIG. 19 is an operation flow chart of the superimposing display method of one embodiment of the present invention.

In step S65, shown in FIG. 17, the host computer 30 determines whether the H size was selected. If the H size was selected, the control program proceeds to step S66. Otherwise, the control program jumps to step S81, as shown in FIG. 18.

In step S66, the host computer 30 superimposes the trimming frame corresponding to the H size aspect ratio on the non-trimmed frame image and displays the superimposed images. The non-trimmed frame image (the first image) is shown in FIG. 9. The superimposed display is shown in FIG. 11. The control program then proceeds to step S67.

In step S67, the host computer 30 determines if the user has input an enlargement command. If the user inputs an enlargement command, the control program proceeds to step S68. Otherwise, the control program jumps to step S71.

In step S68, the host computer 30 displays the image enlarged within the H size trimming frame, as shown in FIGS. 12 and 13. The control program then advances to step S69.

In step S69, the host computer 30 determines if the user has input a write command. The user inputs a write command by operating the "OK" button. If the user operates the "OK" button, the control program advances to step S70.

In step S70, the host computer 30 outputs the H size trimming window data and the enlargement data to the scanner. In the scanner, the H size trimming frame data and the enlargement data are written into the magnetic storage region 77 of the frame. The control program then jumps to step S95.

In step S71, the host computer 30 determines if the user has input the image reduction command. If the user has input the image reduction command, the control program proceeds to step S72. Otherwise the control program jumps to step S75.

In step S72, the host computer 30 displays the reduced size image within the H size trimming frame. The control program then proceeds to step S73.

In step S73, the host computer 30 determines if the user has input a write command. The user inputs a write command by operating the "OK" button. If the user operates the "OK" button, the control program advances to step S74.

In step S74, the host computer 30 outputs the H size trimming frame data and the reduction data to the scanner. In the scanner, the H size trimming frame data and the reduction data are written to the magnetic storage region 77 of the frame. The control program then jumps to step S95.

In step S75, the host computer 30, after determining in steps S67 or S71 that a reduction command has not been input, determines if a write command has been issued. If a write command has been issued, the control program advances to step S76. In step S76, the host computer 30 outputs the H size trimming frame data to the scanner. In the scanner, the H size trimming frame data are written into the magnetic storage region 77 of the frame. The control program then jumps to step S95.

In step S81, as shown in FIG. 18, the host computer 30 superimposes the trimming frame of the P size over the frame image shown in FIG. 9. The superimposed image is displayed as shown in FIG. 11. The control program then advances to step S82.

In step S82, the host computer determines if the user has inputs the image enlargement command. If the user input the image enlargement command, the control program proceeds to step S83. Otherwise, the control program jumps to step S86.

In step S83, the host computer 30 displays the enlarged image within the P size trimming frame, as shown in FIGS. 12 and 13. The control program then proceeds to step S84.

In step S84, the host computer 30 determines if the user has input a write command. The user inputs a write command by operating the "OK" button. If the user operated the "OK" button, the control program proceeds to step S85.

In step S85, the host computer 30 outputs the P size trimming frame data and the enlargement data to the scanner. In the scanner, the P size trimming frame data and the enlargement data are written into the magnetic storage region 77 of the frame. The control program then jumps to step S95.

In step S86, the host computer 30 determines if the user has input the reduction command. If the user inputs the reduction command, the control program proceeds to step S87. Otherwise, the control program jumps to step S90.

In step S87, the host computer 30 displays the reduced image within the P size trimming frame. The control program then proceeds to step S88.

In step S88, the host computer 30 determines if the user has input a write command. The user inputs the write command by operating the "OK" button. If the user inputs a write command, the control program proceeds to step S89. Otherwise, the control program remains at step S88.

In step S89, the host computer 30 outputs the P size trimming frame data and the reduction data to the scanner. In the scanner, the P size trimming frame data and the reduction data are written into the magnetic storage region 77 of the frame. The control program then jumps to step S95.

In step S90, the host computer 30 determines if the user has input a write command. The user inputs a write command by operating the "OK" button. If the user operated the "OK" button, the control program proceeds to step S91. Otherwise, the control program remains at step S90.

In step S91, the host computer 30 outputs the P size trimming frame data to the scanner. In the scanner, the P size trimming frame data is written into the magnetic storage region 77 of the frame. The control program then proceeds to step S95.

In step S95, the host computer 30 determines if the trimming process of the superimposing display is terminated. If the trimming process is terminated, the control program proceeds to step S96. Otherwise, the control program returns to step S31.

In step S96, the host computer 30 determines if the user has input a main scan command. If the user inputs a main scan command, the control program proceeds to step S97. Otherwise, the control program remains at step S96. In step S97, the host computer 30 outputs the main scan command to the scanner.

As described above, the first embodiment of the image reading system allows the user to easily confirm the image of the final output image (window), because the user can directly compare the trimming image (the second or third image) to the original image (the first image).

In addition, the user can directly compare the trimming image (the second or third images) to the original image (the first image), can perform trimming a plurality of times, using the entire body of the original image, and can save the result.

Further, with the first embodiment, the user can easily install the image reading system, without changing hardware.

In the second embodiment of the image reading system, the user can easily confirm the image of the final output image (window), because the user can directly compare the first and second trimming frames to the original image (the first image).

In addition, with the second embodiment, the user can directly compare the first and second trimming frames against the original image (the first image), can perform trimming a plurality of times, using the entire body of the original image, and can save the result.

Further, with the second embodiment, the user can easily install the image reading system, without changing hardware.

Finally, with the second embodiment, the user can simply perform an operation that obtains the desired image, by an enlarged display or a reduced display of the original image within a certain trimming frame, and can save the result.

While the invention has been described in relation to preferred embodiments, many modifications are apparent from the description of the invention, and all such modifications and variations are intended to be with the scope of the present invention as defined in the appended claims.

What is claimed is:

1. A memory medium that stores a control procedure for an image reading system, wherein the image reading system comprises:

image reading means for reading an image, frame-by-frame, of a long-type film, which has image memory and magnetic memory areas in each frame, wherein the frames are the same size, and for outputting an image signal;

magnetic information reading means for reading the magnetic information of said magnetic memory area and for outputting magnetic signals; and display means for displaying an image, wherein first image data is created corresponding to almost an entire image of said image memory area and based upon said image signal, second image data is created corresponding to the image of the image memory area trimmed based on information related to trimming comprising said image signal and said magnetic signals, wherein the control procedure displays a first image from each same size frame corresponding to said first image data and a differently sized second image corresponding to the said second image data on said display means at the same time.

2. The memory medium that stores the control procedure for an image reading system of claim 1, wherein said image reading system further comprises trimming size setting means for setting the trimming size of the image of the image memory area and for outputting a trimming signal, wherein the control procedure converts said second image data to third image data based upon said image signal and said trimming signal, and causes the first image corresponding to said first image data and the third image corresponding to said third image data to be displayed on said display means.

3. The memory medium that stores the control procedure for an image reading system of claim 2, wherein said image reading system further comprises magnetic information writing means for writing in said magnetic memory area, and wherein the control procedure includes writing control means for writing trimming size information set by said trimming size setting means in said magnetic information writing means.

4. A memory medium that stores a control procedure for an image reading system, wherein the image reading system comprises:

image reading means for reading an image, frame-by-frame, of a long-type film that has image memory and magnetic memory areas in each frame, wherein the frames are the same size, and for outputting image signals;

magnetic information reading means for reading the magnetic information of said magnetic memory area and for outputting magnetic signals; and display means for displaying images, wherein the control procedure creates first image data corresponding to almost the entire image of the image memory area based upon the image signals, creates the first trimming frame data based upon the information related to trimming, which is included in said image signals and said magnetic signals, and displays the first image corresponding to the first image data from each same size frame on the display means and displays the first trimming frame to show a different size image corresponding to the first trimming frame data on the display means as superimposed on said first image.

5. The memory medium that stores a control procedure for an image reading system of claim 4, wherein said image reading system comprises trimming size setting means for setting the trimming size of an image of said image memory area and for outputting a trimming signal, and wherein the control procedure converts said first trimming frame data into the second trimming frame data based on said image signals and said trimming signal, and displays a second trimming frame corresponding to said second trimming frame data on the display means as superimposed on said first image.

6. The memory medium that stores a control procedure for an image reading system of claim 5, wherein said image reading system further comprises magnetic information writing means for writing in said magnetic memory area, wherein the control procedure includes a writing control procedure, which writes the trimming size information set by said trimming size setting means in said magnetic information writing means.

7. The memory medium that stores a control procedure for an image reading system of claim 4, wherein said image reading system further comprises:

image size designation means for setting the enlargement or reduction with respect to the image within the trimming frame, and for outputting enlargement data or reduction data; and magnetic information writing means for writing in said magnetic memory area, wherein the control procedure includes a writing control procedure that converts enlargement or reduction from said first image data to said second image data based upon said enlargement or reduction data, displays the second image corresponding to the second image data on the display means, and writes said enlargement or reduction data in said magnetic information writing means.

* * * * *